US009785217B2

(12) United States Patent
Schwartz et al.

(10) Patent No.: US 9,785,217 B2
(45) Date of Patent: Oct. 10, 2017

(54) SYSTEM AND METHOD FOR LOW POWER INPUT OBJECT DETECTION AND INTERACTION

(71) Applicant: Synaptics Incorporated, San Jose, CA (US)

(72) Inventors: Adam Schwartz, Redwood City, CA (US); Joel Jordan, Sunnyvale, CA (US); Joseph Kurth Reynolds, Alviso, CA (US); Jeffrey Small, Rochester, NY (US); Stepan Starchenko, San Francisco, CA (US); Petr Shepelev, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 202 days.

(21) Appl. No.: 13/631,784

(22) Filed: Sep. 28, 2012

(65) Prior Publication Data

US 2014/0092031 A1   Apr. 3, 2014

(51) Int. Cl.
| | | |
|---|---|---|
| *G06F 3/041* | (2006.01) | |
| *G06F 1/32* | (2006.01) | |
| *G06F 3/044* | (2006.01) | |
| *G06F 3/0488* | (2013.01) | |

(52) U.S. Cl.
CPC .......... *G06F 1/3206* (2013.01); *G06F 1/3231* (2013.01); *G06F 1/3262* (2013.01); *G06F 3/044* (2013.01); *G06F 3/04883* (2013.01); *G06F 1/324* (2013.01)

(58) Field of Classification Search
CPC .... G06F 3/04883; G06F 3/017; G06F 3/0488; G06F 3/044; G06F 1/3231; G06F 1/32; G06F 1/3265; G06F 1/3287; G06F 1/3296; G06F 1/324; G06F 1/3243; G06F 1/3246; G06F 1/325; G06F 1/3206; G06F 1/3262
USPC ........................................................ 345/173
See application file for complete search history.

(56) References Cited

U.S. PATENT DOCUMENTS

| | | | | |
|---|---|---|---|---|
| 4,733,222 A | * | 3/1988 | Evans | ............................. 341/33 |
| 5,504,910 A | * | 4/1996 | Wisor | ................... G06F 1/3203 |
| | | | | 713/321 |
| 5,974,558 A | * | 10/1999 | Cortopassi | ............ G06F 1/1613 |
| | | | | 345/173 |
| 7,145,454 B2 | * | 12/2006 | Linjama et al. | .............. 340/540 |

(Continued)

FOREIGN PATENT DOCUMENTS

KR   1020120094728 A   8/2012

OTHER PUBLICATIONS

ISA/KR, International Search Report and Written Opinion for International Application # PCT/US2013/062452, pp. 1-12, dated Jan. 21, 2014 (Jan. 21, 2014).

*Primary Examiner* — Michael J Jansen, II
(74) *Attorney, Agent, or Firm* — Osha Liang LLP

(57) ABSTRACT

In a method of operating a touch screen, an object interaction is detected with the touch screen while in a first doze mode. It is determined if a detected object interaction with the touch screen is a valid input object interaction with the touch screen. In response to determining the object interaction is a valid input object interaction, the touch screen is transitioned from the first doze mode to a gesture recognition mode. The touch screen is transitioned from the gesture recognition mode to an active mode in response to a determination of a valid gesture interaction with the touch screen by the input object.

14 Claims, 13 Drawing Sheets

(56) References Cited

U.S. PATENT DOCUMENTS

| | | | |
|---|---|---|---|
| 7,176,902 B2* | 2/2007 | Peterson, Jr. | G06F 3/043 178/18.01 |
| 7,737,957 B2 | 6/2010 | Lee et al. | |
| 7,873,849 B2* | 1/2011 | Mucignat | G06F 1/3203 702/141 |
| 8,125,456 B2 | 2/2012 | Krah et al. | |
| 8,144,126 B2 | 3/2012 | Wright | |
| 8,169,419 B2 | 5/2012 | Tasher et al. | |
| 8,234,512 B2* | 7/2012 | Mucignat | G06F 1/3203 702/141 |
| 8,271,047 B2 | 9/2012 | Kim et al. | |
| 8,314,779 B2 | 11/2012 | Chan et al. | |
| 8,392,735 B2* | 3/2013 | Mucignat | G06F 1/3203 713/300 |
| 8,635,560 B2 | 1/2014 | Drader et al. | |
| 8,638,317 B2 | 1/2014 | Harada et al. | |
| 8,816,985 B1* | 8/2014 | Tate | G06F 3/041 345/173 |
| 8,866,735 B2* | 10/2014 | Zhao | G06F 1/1626 345/156 |
| 8,970,507 B2* | 3/2015 | Holbein | G06F 1/3203 178/18.01 |
| 2003/0105983 A1* | 6/2003 | Brakmo | G06F 1/3203 713/320 |
| 2004/0181703 A1* | 9/2004 | Lilja et al. | 713/324 |
| 2005/0164633 A1* | 7/2005 | Linjama et al. | 455/41.2 |
| 2006/0202969 A1 | 9/2006 | Hauck | |
| 2006/0278444 A1 | 12/2006 | Binstead | |
| 2008/0012835 A1 | 1/2008 | Rimon et al. | |
| 2008/0196945 A1* | 8/2008 | Konstas | 178/18.03 |
| 2008/0231564 A1* | 9/2008 | Harada et al. | 345/81 |
| 2008/0277171 A1* | 11/2008 | Wright | 178/18.06 |
| 2010/0013778 A1* | 1/2010 | Liu | G06F 1/1626 345/173 |
| 2010/0120470 A1 | 5/2010 | Kim et al. | |
| 2010/0214232 A1* | 8/2010 | Chan et al. | 345/173 |
| 2010/0235667 A1* | 9/2010 | Mucignat | G06F 1/3203 713/323 |
| 2010/0257490 A1* | 10/2010 | Lyon | G06F 3/0488 715/863 |
| 2010/0302198 A1* | 12/2010 | Tasher et al. | 345/173 |
| 2011/0080349 A1* | 4/2011 | Holbein | G06F 1/3203 345/173 |
| 2011/0093729 A1* | 4/2011 | Mucignat | G06F 1/3203 713/323 |
| 2011/0221686 A1 | 9/2011 | Kim et al. | |
| 2011/0304648 A1* | 12/2011 | Kim | G06F 1/1626 345/633 |
| 2012/0133484 A1* | 5/2012 | Griffin | 340/5.54 |
| 2012/0154292 A1 | 6/2012 | Zhao et al. | |
| 2012/0154324 A1* | 6/2012 | Wright | G06F 3/0416 345/174 |
| 2012/0191993 A1* | 7/2012 | Drader et al. | 713/320 |
| 2012/0194471 A1 | 8/2012 | Park et al. | |
| 2012/0297226 A1* | 11/2012 | Mucignat | G06F 1/3203 713/323 |
| 2013/0111415 A1* | 5/2013 | Newman et al. | 715/864 |

* cited by examiner

1100

```
┌─────────────────────────────────────────────────────────────┐
│ OPERATE SENSOR CIRCUITRY CONFIGURED TO DETECT OBJECT        │
│ INTERACTION IN A SENSING REGION OF A TOUCH SCREEN IN A      │
│ LOW POWER STATE, WHEREIN THE LOW POWER STATE                │
│ COMPRISES DETERMINING A PLURALITY OF RESULTING SIGNALS      │
│ USING THE SENSOR CIRCUITRY AT A FIRST RATE                  │
│ 1110                                                        │
└─────────────────────────────────────────────────────────────┘
                              │
                              ▼
┌─────────────────────────────────────────────────────────────┐
│ EXAMINING A DIFFERENCE IN CONSECUTIVE RESULTING SIGNALS     │
│ OBTAINED AT THE FIRST RATE FOR A VALID GESTURE              │
│ INTERACTION                                                 │
│ 1120                                                        │
└─────────────────────────────────────────────────────────────┘
                              │
                              ▼
┌─────────────────────────────────────────────────────────────┐
│ IN RESPONSE TO A DETERMINATION OF A VALID GESTURE           │
│ INTERACTION, EXIT THE LOW POWER STATE                       │
│ 1130                                                        │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  ACQUIRE A BASELINE MEASUREMENT FOLLOWING LIFTOFF OF AN
│ INPUT OBJECT FROM THE TOUCH SCREEN AFTER RECOGNIZING        │
  THE VALID GESTURE INTERACTION
│ 1140                                                        │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 11

SYSTEM AND METHOD FOR LOW POWER INPUT OBJECT DETECTION AND INTERACTION

BACKGROUND

Capacitive input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display screen of the electronic system.

SUMMARY

In a method of operating a touch screen, an object interaction is detected with the touch screen while in a first doze mode. It is determined if a detected object interaction with the touch screen is a valid input object interaction with the touch screen. In response to determining the object interaction is a valid input object interaction, the touch screen is transitioned from the first doze mode to a gesture recognition mode. The touch screen is transitioned from the gesture recognition mode to an active mode in response to a determination of a valid gesture interaction with the touch screen by the input object.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIG. 1 is a block diagram of an example input device, in accordance with embodiments;

FIG. 2 shows a portion of an example sensor electrode pattern which may be utilized in a sensor to generate all or part of the sensing region of an input device, such as a touch screen, according to some embodiments;

FIG. 3 shows an example processing system which may be utilized with the example input device of FIG. 1, according to various embodiments;

FIG. 4 is a state diagram of a method of low power wakeup having two doze modes, according to various embodiments;

FIG. 5 is a state diagram of a method of low power wakeup having two doze modes with at least one of the doze modes being modified by an orientation and/or movement of an electronic system, according to various embodiments;

FIG. 6 illustrates a block diagram of the operation of low power gesture recognition logic, according to various embodiments;

FIG. 7 illustrates a state diagram of a method of wakeup upon gesture recognition, according to various embodiments;

FIGS. 5A, 8B, and 8C illustrate some non-limiting examples of valid continuous gestures, which may be employed with various embodiments described herein;

FIG. 8D illustrates a non-limiting example of a valid discrete gesture, which may be employed with various embodiments described herein;

FIG. 8E illustrates a non-limiting example of a valid combination of continuous and discrete gestures, which may be employed with various embodiments described herein.

FIGS. 9A and 9B illustrate some non-limiting examples valid discrete gestures, continuous gestures, and combination discrete and continuous gestures, which may be employed with various embodiments described herein;

FIGS. 10A and 10B illustrates a flow diagram of procedures in an example method of operating a touch screen, according to various embodiments; and FIG. 11 illustrates a flow diagram of procedures in an example method of operating a touch screen, according to various embodiments.

DESCRIPTION OF EMBODIMENTS

The following Description of Embodiments is merely provided by way of example and not of limitation. Furthermore, there is no intention to be bound by any expressed or implied theory presented in the preceding, background, summary, brief description of drawings, or the following detailed description.

Overview of Discussion

Herein, various embodiments are described that provide input devices, processing systems, and methods that facilitate improved usability. In various embodiments described herein, the input device may be a capacitive input device in the form of a touch screen that is co-located with or at least partially overlaps a display screen of an electronic system.

Discussion begins with a description of an example input device with which or upon which various embodiments described herein may be implemented. An example sensor electrode pattern is then described. This is followed by description of an example touch screen processing system and some components thereof. The touch screen processing system may be utilized with a capacitive input device that includes a sensor electrode pattern. Several state diagrams and block diagrams which describe operation of low power wakeup and/or gesture recognition logic and methods are presented and describe. A selection of several examples of valid gestures for triggering a wakeup are depicted and discussed. Operation of the touch screen and processing system are then further described in conjunction with description of a method of operating a capacitive input device.

Example Input Device

Turning now to the figures, FIG. 1 is a block diagram of an exemplary input device 100, in accordance with various embodiments. Input device 100 may be configured to provide input to an electronic system, such as electronic system 150. As used in this document, the term “electronic system” (or “electronic device”) broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In some embodiments, as illustrated in FIG. 1, electronic system 150 includes a host processing system which may include one or more integrated circuits used to process information for electronic system 150. Electronic system 150 may further include a touch screen processing system 110 that is separate from host processing system 155, and which is utilized to operate a touch screen 115 that is collocated with or at least partially overlaps display screen 170. Electronic system 150 may, in some embodiments, further include a display screen processing system 160 which operates display screen 170 to display information and graphical content. In some embodiments, some or all of the functionality of display screen processing system 160 may be combined with or otherwise incorporated into touch screen processing system 110. For example, in one embodiment, a touch screen processing system 110 and display screen processing system 160 may be implemented as a single processing system which operates both a display screen 170 and a touch screen 115. In other embodiments, touch screen processing system 110 may include the capability to store some sprites/graphics in a memory and display them in response to touch screen interactions in sensing region 120, without requiring any interaction with either host processing system 155 or a separate display screen processing system 160.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes. As depicted in FIG. 1, in some embodiments, sensing region 120 is designed to at least partially overlap with a display screen, such as display screen 170 that is used to display information and graphics of electronic system 150.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals.

Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows virtual capacitive touch sensing buttons 130 (130a, 130b) located at designated locations within sensing region 120. Virtual buttons 130 can be used to facilitate selection of items using input device 100. Actual non-mechanical capacitive sensing buttons can similarly be disposed within sensing region 120 and outside an active area of a display screen 170. Other types of additional input components include sliders, balls, wheels, switches, and the like. One or more of these other types of additional input components may be implemented in or near sensing region 120. Conversely, in some embodiments, input device 100 may be implemented with no additional input components.

In some embodiments, input device 100 may be a touch screen 115, and sensing region 120 overlaps at least part of an active area of a display screen 170. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology, Example Sensor Electrode Pattern FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. When collocated with or at least partially overlapping a display screen (e.g., display screen 170 of FIG. 1), sensor electrodes of sensor electrode pattern 200 may be referred to as a touch screen 115. For purposes of clarity of illustration and description, a non-limiting simple rectangular sensor electrode pattern 200 is illustrated, in this rectangular pattern, sensor electrodes cross each other at an angle, which is approximately 90 degrees relative to one another. It is appreciated that other crossing angles are possible and anticipated. Likewise, it is also appreciated that numerous other sensor electrode patterns and/or electrode shapes may be employed.

The illustrated sensor electrode pattern is made up of a first plurality of sensor electrodes 260 (260-0, 260-1, 260-2, 260-3, 260-4, 260-5 . . . 260-n) and a second plurality of sensor electrodes 270 (270-0, 270-1, 270-2 . . . 270-n) which overlay one another, in this example. It is appreciated that a greater or lesser number of sensor electrodes 260 and/or sensor electrodes 270 may be utilized in other embodiments. In the illustrated example, when sensor electrode pattern 200 is utilized in a transcapacitive sensing mode, touch sensing capacitive pixels are centered at locations where sensor electrodes 260 and sensor electrodes 270 cross. Capacitive pixel 290 illustrates one of the capacitive pixels generated by sensor electrode pattern 200. It is appreciated that in a crossing sensor electrode pattern, such as the illustrated example, some form of insulating material or substrate is typically disposed between sensor electrodes 260 and sensor electrodes 270. However, in some embodiments, sensor electrodes 260 and sensor electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Capacitive pixels, such as capacitive pixel 290, are areas of localized capacitive coupling between a receiver electrode (e.g., 260-0) and a transmitter electrode (e.g., 270-0). The capacitive coupling between such receiver electrodes and transmitter electrodes changes with the proximity and motion of input objects in the sensing region associated with the pair of receiver electrode and transmitter electrodes.

In some embodiments, sensor electrode pattern 200 is "scanned" to determine these capacitive couplings. That is, the transmitter electrodes (e.g., sensor electrodes 270) are driven to transmit transmitter signals (e.g., modulated voltages). Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 260 to be independently determined.

Receiver electrodes (e.g., sensor electrodes 260) may be operated singly or in multiples to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

It is appreciated that sensor electrodes 260 and sensor electrodes 270 may be operated in an absolute sensing mode as well as in the transcapacitive sensing modes described above. In an absolute sensing mode, each sensor electrode (260, 270) is both used for both transmitting and receiving. For example, a sensor electrode is charged by driving by a voltage signal on the sensor electrode and then the absolute capacitance between the sensor electrode and its environment (to include a coupling to any input object in that environment) is measured. In some embodiments, X-Y profile sensing may be accomplished by operating sensor electrodes 260 and 270 in an absolute sensing mode.

Example Processing System

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific integrated Circuits (ASICSs), one or more integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100, of which it is a part, may be disposed in or communicatively coupled with an electronic system 150, such as a display device, computer, or other electronic system.

In one embodiment of input device 100, processing system 110A includes, among other components: sensor circuitry 310, and control logic 320. In some embodiments processing system 110A may further include display update circuitry 360 which performs some or all of the functions of display screen processing system 160. Processing system 110A and/or components thereof may be coupled with sensor electrodes of a sensor electrode pattern, such as sensor electrode pattern 200. For example, sensor circuitry 310 is coupled with one or more sensor electrodes of a sensor electrode pattern (e.g., sensor electrode pattern 200) of input device 100.

Sensor circuitry 310 operates receiver and transmitter sensor electrodes of a sensor pattern of a touch screen 115 that is utilized to generate a sensing region 120, in order to detect an object interaction in sensing region 120. This includes operating transmitter electrodes to be silent or transmit a transmitter signal when a capacitive input device is operated in a transcapacitive mode. This also includes utilizing receiver sensor electrodes, in a transcapacitive mode, to receive resulting signals that result from the transmissions from the transmitter electrodes. In a transcapacitive mode, sensor circuitry 310 may also determine from received resulting signal(s) that an input has occurred in sensing region 120, as well as determining a location of the input with respect to sensing region 120. Sensor circuitry 310 may further operate sensor electrodes (260, 270) in an absolute capacitive sensing mode in which a signal is modulated on a sensor electrode and then capacitance changes introduced by an input object are measured to determine the presence of an input object.

As depicted in FIG. 3, sensor circuitry 310 may include one or more of transmitter circuitry 311, receiver circuitry 312, and computation circuitry 313.

Transmitter circuitry 311 operates to transmit transmitter signals on one or more sensor electrodes. In a transcapacitive sensing mode, transmitter circuitry 311 transmits transmitter signals on transmitter electrodes. In an absolute capacitive sensing mode, transmitter circuitry 311 may transmit a signal on any sensor electrode (260, 270) of a sensor electrode pattern and/or maintain any sensor electrode at a selected electrical potential.

In a given time interval, transmitter circuitry 311 may transmit or not transmit a transmitter signal (e.g., a waveform) on one or more of a plurality of sensor electrodes. Transmitter circuitry 311 may also be utilized to couple one or more sensor electrodes of a plurality of sensor electrodes to high impedance, ground, or to a constant voltage when not transmitting a waveform on such sensor electrodes. The transmitter signal may be a square wave, trapezoidal wave, or some other waveform. Transmitter circuitry 311 may code a transmitter signal, such as in a code division multiplexing scheme. The code may be altered, such as lengthening or shortening the code, under direction of control logic 320. Lengthening the code is one technique for avoiding interference.

Receiver circuitry 312 operates in a transcapacitive sensing mode to receive resulting signals via one or more sensor electrodes which are not being transmitted upon. That is, a resulting signal is received from a receiver electrode of a capacitive sensor device. In a transcapacitive sensing mode received resulting signals correspond to and include some version of the transmitter signal(s) transmitted via the transmitter electrodes. These transmitted transmitter signals however, may be altered or changed in the resulting signal due to stray capacitance, noise, interference, and/or circuit imperfections among other factors, and thus may differ slightly or greatly from their transmitted versions. To avoid interference, receiver circuitry 312 may be equipped to implement one or more filtering operations, which may include utilizing either or both of linear and non-linear filtering techniques. Resulting signals may be received on one or a plurality of receiver electrodes during a time interval. Receiver circuitry 312 includes a plurality of amplifiers, typically one per receiver electrode. Such amplifiers may be referred to herein as amplifiers, front-end amplifiers, integrating amplifiers, or the like, and receive a reference voltage at a first input and a resulting signal at a second input.

In some embodiments, receiver circuitry 312 operates in an absolute sensing mode to receive signals representative of an absolute capacitance measured on a sensor electrode.

Computation circuitry 313 operates to compute/determine a measurement of a capacitive coupling or change in a capacitive coupling between a transmitter electrode and a receiver electrode in a transcapacitive sensing mode, and/or to compute/determine a measurement a capacitive coupling or a change in a capacitive coupling to a sensor electrode in an absolute capacitance sensing mode. Computation circuitry then uses these measurements of capacitance to determine the position of an input object (if any) with respect to sensing region 120.

Control logic 320 comprises decision making logic which directs processing system 110A and sensor circuitry 310 to operate in a selected one of a plurality of different operating modes. For example, control logic 320 may direct sensor circuitry 310 to operate sensor electrodes of a sensor electrode pattern in a transcapacitive sensing mode or an absolute capacitive sensing mode to detect for inputs at periodic intervals associated with a sensing duty-cycle. Control logic 320 may direct sensor circuitry 310 to operate at one or more of a variety of duty-cycles in order to perform detection with sensor electrodes at a normal duty-cycle associated with fully awake active mode operation and one or more lower than normal operational power settings called doze modes. The doze modes utilize relaxed or reduced duty-cycles in comparison to the normal fully awake active mode duty-cycle at which sensor circuitry 310 is operated. Control logic 320 may also operate to determine/classify an input object detected by sensor circuitry 310 as a valid or invalid input object and/or to process an input object detected by sensor circuitry 310 to determine if the input provided by the input object corresponds to what is recognized as a valid gesture input in sensing region 120 of input device 100. Such determination and/or classification of valid inputs and/or gestures may occur both in normal full duty-cycle operation of sensor circuitry 310 and in a reduced duty-cycle doze mode operation of sensor circuitry 310.

It is appreciated that there may be multiple types of such doze modes in which the operation of sensor circuitry 310 has a different reduced duty-cycle in each. It is appreciated that "reduced" means lower in duty-cycle than the fully awake active mode operation duty-cycle at which sensor circuitry 310 is operated. For example, in one embodiment, in a first doze mode control logic 320 directs sensor circuitry 310 to operate in a partially reduced duty-cycle (e.g., 50% of normal operation) and in a second doze mode control logic 320 directs sensor circuitry 310 to operate at a more greatly reduced duty-cycle (e.g., 20% of normal operation). Control logic 320 may be implemented as hardware (e.g., hardware logic and/or other circuitry) and/or as a combination of hardware and instructions stored in a non-transitory manner in a computer readable storage medium. In some embodiments, control logic 320 includes one or more of first doze logic 321, second doze logic 322, input object determination logic 323, and low power gesture recognition logic 324.

First doze logic 321, in one embodiment, operates sensor circuitry 310 in a first doze mode at some duty-cycle that is less than 100% of the active mode duty-cycle of sensor circuitry 310. The first doze mode of operation also comprises host processing system 155 being in a low power state and operations associated with a touch screen 115 of electronic system 150 being processed by touch screen processing system 110A. This includes operating sensor circuitry 310 to detect for valid input object interactions (e.g., from input objects 140) in sensing region 120. When sensor circuitry 310 detects an object while being operating by first doze logic 321, outputs from computation circuitry 313 are provided to input object determination logic 323 to determine if the detected object is a valid input object.

Second doze logic 322, in one embodiment, operates sensor circuitry 310 in a second doze mode at some duty-cycle that is less than 100% of the active mode duty-cycle of sensor circuitry 310 and which is also a lower duty-cycle than sensor circuitry 310 is operated by first doze logic when in the first doze mode. The second doze mode of operation, like the first doze mode, also comprises host processing system 155 being in a low power state and operations associated with a touch screen 115 of electronic system 150 being processed by touch screen processing system 100A. For instance, if first doze logic 321 operates sensor circuitry at 60% of the normal full power duty-cycle, then second doze logic 322 operates sensor circuitry at some duty-cycle that is typically lower than 60% of the active mode and/or relaxes a capacitive sensing baseline so that a previously sensed invalid input object is less likely to be repeatedly sensed. This includes operating sensor circuitry 310 to detect for object interactions (e.g., from input objects 140) in sensing region 120. When sensor circuitry 310 detects an object while operating in second doze logic 322, outputs from computation circuitry 313 are provided to input object determination logic 323 to determine if the detected object is a valid input object.

Input object determination logic 323 operates to determine, based on size, shape, and/or location of a sensed input (as provided by computation circuitry 313), whether the sensed input constitutes an input from a valid input object 140, such as a human digit or a stylus, which can create a valid gesture. When an detected object is determined to be a valid input object (e.g., such as input objects 140), operation of sensor circuitry 310 is handed off from first doze logic 321 or second doze logic 322 (whichever is in operation) to low power gesture recognition logic 324. When an detected object is determined to be from an invalid input object, operation of sensor circuitry 310 remains with first doze logic 321 or second doze logic 322 (whichever is in operation) or else may, in some embodiments, be transitioned from first doze logic 321 to second doze logic 322.

In some embodiments, one or more of first doze logic 321, second doze logic 322, and input object determination logic 323 incorporates orientation inputs 370 and/or movement inputs 380 into its functions. Through use of movement inputs 380 and/or orientation inputs 370 provided by an electronic system 150, a detected object may be ignored if the orientation and or movement of touch screen 115 is judged to be in an invalid state. An invalid state of the touch screen is any motion or orientation state where the likelihood of a detected object being a valid input object is pre-judged to be very minimal. For example, if it is known through movement inputs 380 that electronic system 150 is rapidly swinging (e.g., from being in the hand of a runner) a sensed object may be ignored, as input during such movement is very unlikely. Likewise, if it is known from orientation inputs 370 that electronic system 150 is upside down (e.g., touch screen 115 is facing down on a surface), a sensed object may be ignored as it is very unlikely that a valid input is possible in such an orientation. Such movement and/or orientation inputs (380, 370) may be provided by one or more sensors such as, for example, accelerometers, gyroscopes, and or magnetometers, which are a part of electronic system 150. Such movement and orientation inputs may be utilized by touch screen processing system 110A in an embodiment where such sensors remain active and available to touch screen processing system 110A when host processing system 155 is in a low power state/sleep mode.

Low power gesture recognition logic 324 is utilized to detect whether a valid input object detected, by input object during at a reduced duty-cycle operation of sensor circuitry 310 performs what is referred to as a "valid gesture." Low power gesture recognition logic 324 performs gesture recognition while sensor circuitry 310 is operating at less than 100% of its normal full power duty-cycle and while host processing system 155 remains in a low power state. For example, low power gesture recognition logic 324 may operate sensor circuitry 310 at the same duty-cycle as first doze logic 321 operates sensor circuitry 310.

In order to recognize gestures while operating at a reduced sensing duty-cycle, low power gesture recognition logic 324 only recognizes certain gestures as "valid gestures." Herein, a valid gesture is any of one or more predefined gesture inputs that may be performed in a sensing region 120. By definition, herein, a valid gesture: a) requires movement relative to a touch screen 115 (i.e., cannot be a stationary touch and hold); b) moves at a speed which can be detected during the reduced duty-cycle gesture recognition at which low power gesture recognition is being performed; c) lasts long enough to be detected during the reduced duty-cycle of sensing that gesture recognition at which low power gesture recognition is being performed; d) is distinguishable from accidental contact; and e) ends with an input object lifting off from the touch screen 115. Many gestures satisfy this definition to include multiple taps on the touch screen 115, continual motion on the touch screen 115, or some combination. Several non-limiting examples of such valid gestures are described elsewhere herein.

In one embodiment, when low power gesture recognition logic 324 detects and recognizes the input of a valid gesture which ends in input object 140 liftoff from the touch screen 115, it then directs: sensor circuitry 310 to acquire a new capacitive sensing baseline; directs touch screen processing system 110A to operate in an active mode (100% of normal operating duty-cycle for sensing inputs); and directs host processing system 155 to depart from a low power state and transition to an active mode where more power is consumed than in the low power state. It is appreciated, that this process of transitioning host processing system 155 of electronic system 150 from a low power state to an active state is accomplished with no electromechanical input for signaling the transition. That is, the only signaling is based on touch sensing in sensing region 120 of touch screen 115 of electronic system 150.

Display update circuitry 360, when included as a part of processing system 110A, operates to provide updates to display screen 170. In some embodiments, such updates can be performed in a low power state such as with a dimmer than full power operation display and/or without awakening host processing system 155 from a low power state/sleep mode. Some of such updates may include presenting a stored sprite such as a pattern to trace in order to perform a valid gesture which will cause an electronic system 150 to wake-up and begin operating at an active state (e.g., a full power operating mode) and/or presenting information on display screen 170 in response to sensing of a valid input object. Some non-limiting examples of such limited information include presenting the current time on display screen 170 and/or presenting a numerical status of the number of unread messages in a text message in-box or an electronic mail in-box.

FIG. 4 is a state diagram 400 of a method of low power wakeup having two doze modes, according to various embodiments. State 410 begins and is entered when an electronic system 150, of which a touch sensing processing system 110A is a part, enters a first low power state (first doze mode) after a period of receiving no user input via a touch screen, such as touch screen 115. As previously described, first doze logic 321 may direct periodic operation of sensor circuitry 310 in this first doze mode. With respect to the first doze mode, consider an example where an active state of touch sensor processing system 110A and electronic system 150 involves operating sensor circuitry 310 at a duty-cycle of W ms (for example 16.7 ms) between periodically sensing for user input. In one such example embodiment, first doze logic operates sensor circuitry 310 in a first doze mode with a relaxed duty-cycle of X ms (e.g., 70 ms) between periodic sensing for user input. As indicated by arrow 411, when no input object is detected, first doze logic 321 continues to operate sensor circuitry 310 in the same fashion. While in a doze mode, such as the doze modes of states 410 and 430, the sensor circuitry 310 may perform input sensing in a variety of ways. For example, the sensor circuitry 310 may perform absolute or trans-capacitive sensing, may perform hybrid sensing (i.e., a duty cycle comprising a rate of absolute and trans-capacitive sensing) may perform sensing using a plurality of sensor electrodes simultaneously, may scan only a subset of the sensing region where a valid input object and gesture are required, and/or may only scan input along a single axis of the sensing region (e.g., a one dimensional (1D)_profile of an axis of the sensing region).

As shown by arrow 413, if an object is detected, operation transitions from state 410 to state 420 and input object determination logic 323 checks for validity of the object that was detected by running checks to determine if the object appears to be a valid input object 140 such as a stylus or human digit or else an invalid input object such as interference or the thigh of a person. In one embodiment, processing system 110A may provide a traceable pattern of a valid gesture and/or some limited information on display screen 170 in response to sensing of a valid input object. Some non-limiting examples of such limited information include presenting the current time on display screen 170 and/or presenting a numerical status of the number of unread messages in a text message in-box or an electronic mail in-box. As indicated by arrow 421, if the detected input object is determined to be a valid input object 140 a transition is made from state 420 to a gesture recognition state 440. While in the state 420, the sensor circuitry 310 may perform input sensing in a variety of ways. For example, the sensor circuitry 310 may perform absolute or trans-capacitive sensing, may perform sensing using a plurality of sensor electrodes simultaneously, may scan only a subset of the sensing region where a valid input object and gesture are required, may only scan input along a single axis of the sensing region (e.g., a 1D profile of an axis of the sensing region), may complete a previous partial scan completed during the first doze mode in state 410 and/or perform a second axis single axis scan (e.g., a second 1D profile along another axis of the sensing region).

As indicated by arrow 422, in an embodiment where the detected input object is determined to be an invalid input object, a transition is made to a second doze mode state 430, and first doze logic 321 hands off control of sensor circuitry 310 to second doze logic 322 to sense for input objects. Second doze logic 322 operates sensor circuitry 310 in an even more relaxed manner than in first doze mode and/or relaxes the capacitive sensing baseline so that the invalid input object which caused entry into the second doze mode is less likely to be sensed. For example, in one embodiment where the second doze mode involves a relaxed duty-cycle, the duty-cycle may be relaxed either immediately or incrementally to Y ms (e.g., 1 second) between periodic sensing for a user input. Second doze logic 322 additionally or alternatively relaxes the capacitive sensing baseline so that a persistent invalid input such as interference or a large input object such as a user's thigh (which may be sensed when electronic system 150 is pocketed) is less likely to be repeatedly detected. While in the second doze mode state 430, a transition to check for the validity of the detected object continues to occur as is indicated by arrow 433 and the transition to state 420. As is indicated by arrow 431, if no input object is detected, operation remains in state 430 and the second doze mode for a predetermined period of time such a Z ms. In some embodiments, a timeout occurs and operation transitions from state 430 back to state 410, and the first doze mode state, as indicated by arrow 434, for example, if no input object is sensed in Z ms (e.g., 1000 ms). Whereupon entering state 410, a new capacitive sensing baseline is acquired and detection occurs at a duty-cycle of X ms between periodic sensing for user input.

In gesture recognition state 440 low power gesture recognition logic 324 checks to determine whether a detected object completes a valid gesture. This gesture recognition may occur at a relaxed duty-cycle, such as the same duty-cycle utilized in the first doze mode. As indicated by arrow 441 if the valid input object does not provide a valid gesture interaction or a timeout occurs due to no valid gesture interaction being received within a predefined period of time, then operation transitions from state 440 back to state 410. As indicated by arrow 422, if a valid gesture interaction is recognized from the valid input object, then operation transitions from state 440 to state 450 where processing system 110A operates in an active mode. In one embodiment, a new capacitive sensing baseline is acquired upon the recognition of a valid gesture interaction. The capacitive sensing baseline is acquired after lift-off of the input object from touch screen 115 following the completion of a valid gesture interaction. In active mode (e.g., state 440), a signal may be sent to awaken host processing system 155 from a low power state to an active mode.

FIG. 5 is a state diagram 500 of a method of low power wakeup having two doze modes with at least one of the doze modes being modified by an orientation and/or movement of an electronic system 150, according to various embodiments. Like items in state diagrams 400 and 500 operate in like manners. State diagram 500 differs from state diagram 400 in that movement and orientation inputs are incorporated into the first doze mode at state 410 and/or into the second doze mode at state 430. Thus, if orientation and/or movement information received from sensors of an electronic system 150 indicate that electronic system 150 or its touch screen 115 are in what is considered an invalid movement and/or orientation state for receiving user input, a detected object will not cause a transition between states. This is reflected by arrow 512 which shows that an object detected during an invalid orientation state and/or invalid movement state will result in state 410 being continued. However, as shown by arrow 513, if an input object is detected while in a valid orientation and/or movement state, then a transition from state 410 to state 420 occurs and the input object is checked to determine if it is a valid input object. Additionally or alternatively, in some embodiments, when it is recognized that movement and/or orientation of electronic system 150 are in an invalid state for likely receiving user input, the duty-cycle of the first doze mode in state 410 may be further relaxed until a valid orientation and/or valid movement state is realized.

With reference to state 430, the inclusion of movement and/or orientation information is reflected by arrow 532 which shows that an object detected during an invalid orientation state and/or invalid movement state will result in state 430 being continued. However, as shown by arrow 533, if an input object is detected while in a valid orientation state and/or a valid movement state, then a transition from state 430 to state 420 occurs and the object is checked to determine if it is a valid input object. Additionally or alternatively, in some embodiments, when it is recognized that movement and/or orientation of electronic system 150 are in an invalid state for likely receiving user input, the duty-cycle of the second doze mode in state 430 may be further relaxed until a valid orientation state and/or a valid movement state is realized. For example, an invalid orientation state may comprise the electronic system 150 being in an upside down or "face down" orientation (where the sensing region is likely inaccessible by a user). Furthermore, a valid orientation or movement state may comprise a substantially constant orientation and movement of the electronic system 150 changing to indicate likely imminent input. For example, the correct portrait orientation and movement followed by a cessation in movement may increase a duty cycle of a doze mode.

In an embodiment where processing system 110A provides a traceable pattern of a valid gesture and/or some limited information on display screen 170 in response to sensing of a valid input object, such display information can be enabled when it is known that electronic system 150 is in a valid movement/orientation state and disabled when it is known that electronic system 150 is in or enters an invalid orientation state. For example, when a traceable gesture pattern and/or limited information are being displayed on display screen 170, display screen 170 can be shut off immediately (to further conserve power) in response to an invalid orientation/movement state being entered by electronic system 150.

FIG. 6 illustrates a block diagram 600 of the operation of low power gesture recognition logic 324, according to various embodiments. It should be appreciated that block diagram 600 provides only one non-limiting example, and that there are other ways that low power gesture recognition logic 324 may be operated. As illustrated, gesture recognition may be performed in a stateless manner where "state" refers to some stored estimate of some capacitance of the sensor. Sensor circuitry 310 provides a stream of successive capacitive sensing inputs 605 that are acquired from touch screen inputs. The capacitive sensing inputs 605 may be in the form of capacitive images or capacitive profiles. One or more filters 610 are utilized to filter the capacitive sensing inputs, thus eliminating any static or DC baseline signals and leaving only input response signals. In one embodiment, filter(s) 610 are one or more high pass filters. For example, a high pass filter 610 may filter an input capacitive image 605 on a per pixel basis to leave only portions which have changed from a baseline more rapidly overtime than any change in the baseline from temperature drifts or other environmental effects. In one embodiment, the most recent previous capacitive sensing input 605 is used as a reference for the current capacitive sensing input 605. In such an embodiment, high pass filter operations may be performed by differencing the current capacitive sensing input from the most recent previous capacitive sensing input that is being used as a reference. For example, in the case of a filtered capacitive image or profile input 605, the filtered result contains nonzero values only where motion occurred. The filtering operations may also adapt to environmental conditions. For instance, the high pass frequency cutoff may adjust according to, for instance, noise or temperature measurements or input data from 380 (movement information). Successive filtered capacitive sensing inputs 615 are passed to one or more gesture detectors 620 (620-1, 620-2, . . . 620-n), each of which includes a rolling (first in/first out) buffer and each of which compares a rolling series of buffered filtered capacitive sensing inputs 615 (e.g., 10 filtered capacitive image frames) to determine if a valid gesture is represented by the series of filtered capacitive sensing inputs 615. For example, if only three valid gestures can be recognized by a touch screen processing system 110A, three gesture detectors 620 may be employed, with each checking the rolling series of filtered capacitive sensing inputs 615 for presence of a respective one of the three recognized gestures. A greater or lesser number of gesture detectors can be employed depending on the number of valid gestures that can be recognized more by a touch screen processing system 110A.

As previously described, because of slow sample rates and the necessity of weeding out accidental contact, a valid gesture is defined to have certain characteristics such as movement and speed which can be detected at a low sample rate, duration of the gesture which allows adequate sampling during a low sampling rate, distinguishability as compared to accidental contact (such as by matching to a predefined and expected gesture input), and liftoff at conclusion to signal that the gesture is complete. A gesture detector 620 that recognizes a valid gesture communicates such occurrence in the form of a wakeup decision 630. Wakeup decision 630 provides a signal (which may be an interrupt) to host processing system 155 which causes host processing system 155 to transition from a low power state to an active mode. Similarly, wakeup decision 630 may be provided to touch screen processing system 111A and/or display screen processing system 160 (if utilized) in order to trigger transition from a low power state of operation to an active mode.

It should be appreciated that in some embodiments, the low power gesture recognition using rolling comparison of capacitive sensing inputs 605 can be utilized as a single stateless doze mode without the first and second doze mode states (410 and 430) and the input object validity check state 420 that are illustrated in FIGS. 4 and 5. In such an embodiment, any object which is sensed as making a valid gesture is considered to be a valid input object. In some embodiments, states of operation can be added to this low power gesture recognition technique to further lower the power required to perform the gesture recognition. For example, movement and/or orientation states of the input device may be used to compliment the single stateless doze mode.

FIG. 7 illustrates a state diagram 700 of a method of wakeup upon gesture recognition, according to various embodiments. State 710 is an active mode in which gesture recognition (of the rolling comparison type described above or some other form of gesture detection) is performed at a normal, active mode duty-cycle for user input via a touch screen. In one embodiment, for example, this normal duty-cycle may be 120 Hz. Arrow 711 illustrates that after a predefined period of time passes without a new input being sensed, a transition occurs from state 710 to state 720.

At state 720, low duty-cycle gesture recognition (of the rolling comparison type described above) occurs. To save power, the duty-cycle for sensing for user input via a touch screen is reduced as compared to the normal duty-cycle. For example, the low duty-cycle gesture recognition may be accomplished at 30 Hz, in one embodiment. As indicated by arrow 722, if a gesture is detected, a transition occurs from state 720 to state 710. This is equivalent to the wakeup decision 630 illustrated in FIG. 6. Arrow 721 illustrates that after a predefined period of time passes without a new input being sensed, a transition occurs from state 720 to state 730.

At state 730, very low duty-cycle activity detection occurs. Activity detection at state 730 is performed in the manner as described above with respect to a rolling comparison between sensed inputs, except that fewer inputs are compared. For example as few as two consecutive inputs may be compared to determine if there is any input activity. To further save power, in state 730 the duty-cycle for sensing for user input via a touch screen is reduced to a very low duty-cycle as compared to the duty-cycle of the low duty-cycle gesture recognition of state 720. For example, very low duty-cycle activity detection in state 730 may be accomplished at 1 Hz, in one embodiment. As indicated by arrow 731 if no input activity is detected, the state 730 is not exited. However, as indicated by arrow 732, if input activity is detected, a transition occurs from state 730 to state 720.

In one embodiment, state 720 is used to detect the initial or beginning of a gesture activity (e.g., an initial contact or tap), similar to that of state 730. Upon detection of the initial valid contact, state 720 is exited and state 710 is entered. In state 710, the remainder of the gesture is detected and determined to be valid or invalid. If the gesture is valid, state 710 persists; if the gesture is invalid, state 720 is entered. Thus, in various embodiments, valid gesture detection may occur only in state 720 or 710 or as a combination of states 720 and 710.

Examples of Valid Gestures for Triggering a Low Power Wakeup

In general, there are two types of valid gestures which can be utilized with embodiments described herein to trigger a wakeup from a low power state to an active mode. These are continuous gestures and discrete gestures, and they may be used separately or in combination to create a valid gesture.

FIGS. 8A, 8B, and 8C illustrate some non-limiting examples of valid continuous gestures, which may be employed with various embodiments described herein.

Figure 1:
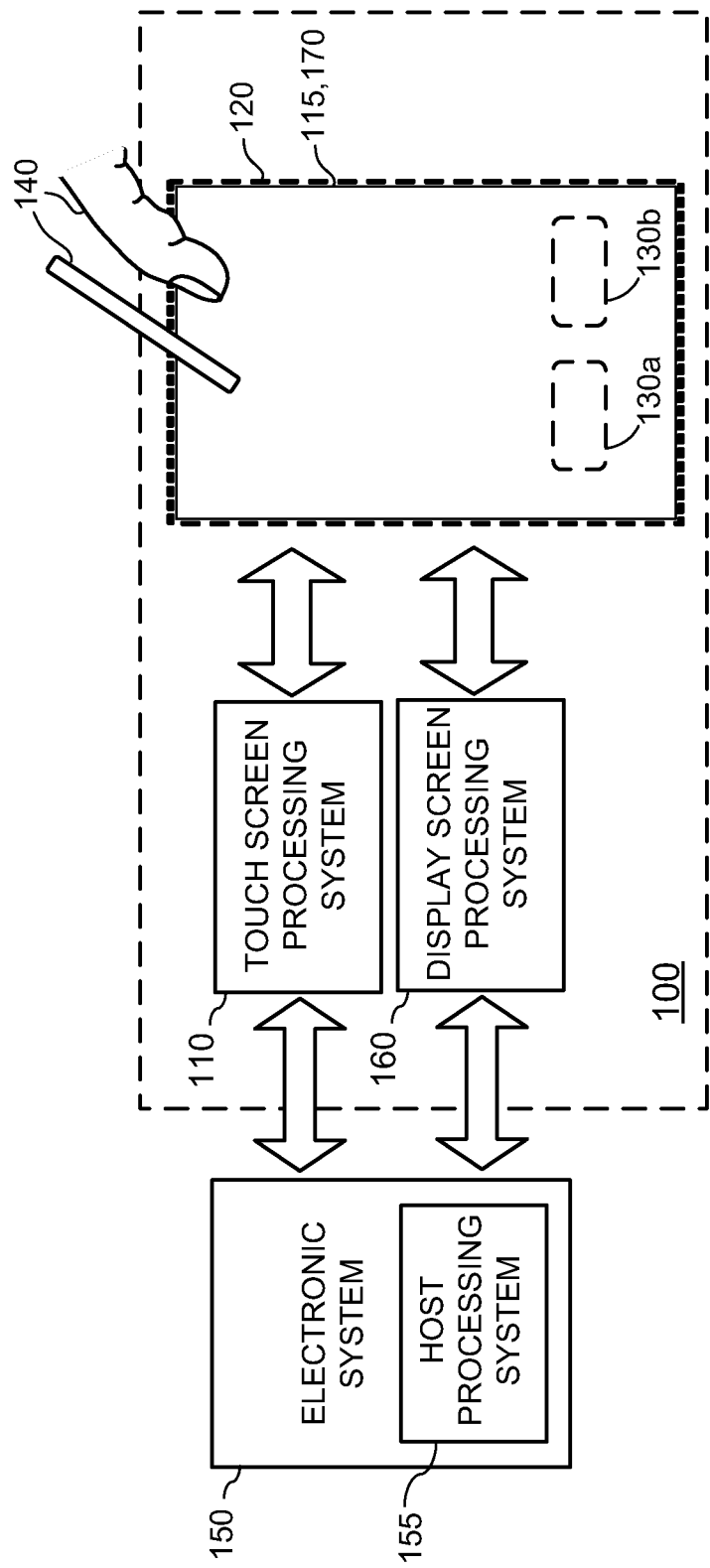
Figure 2:
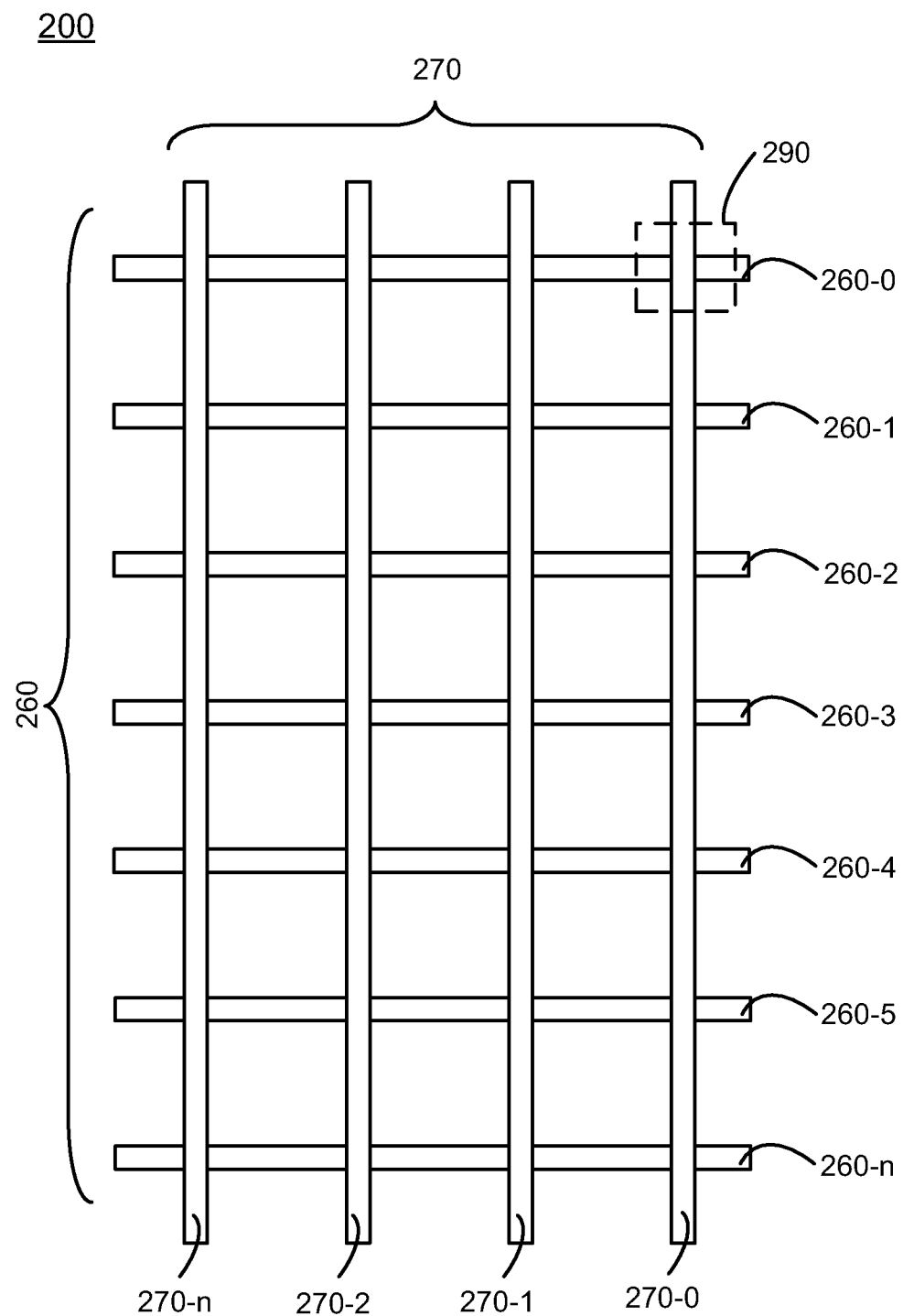
Figure 3:
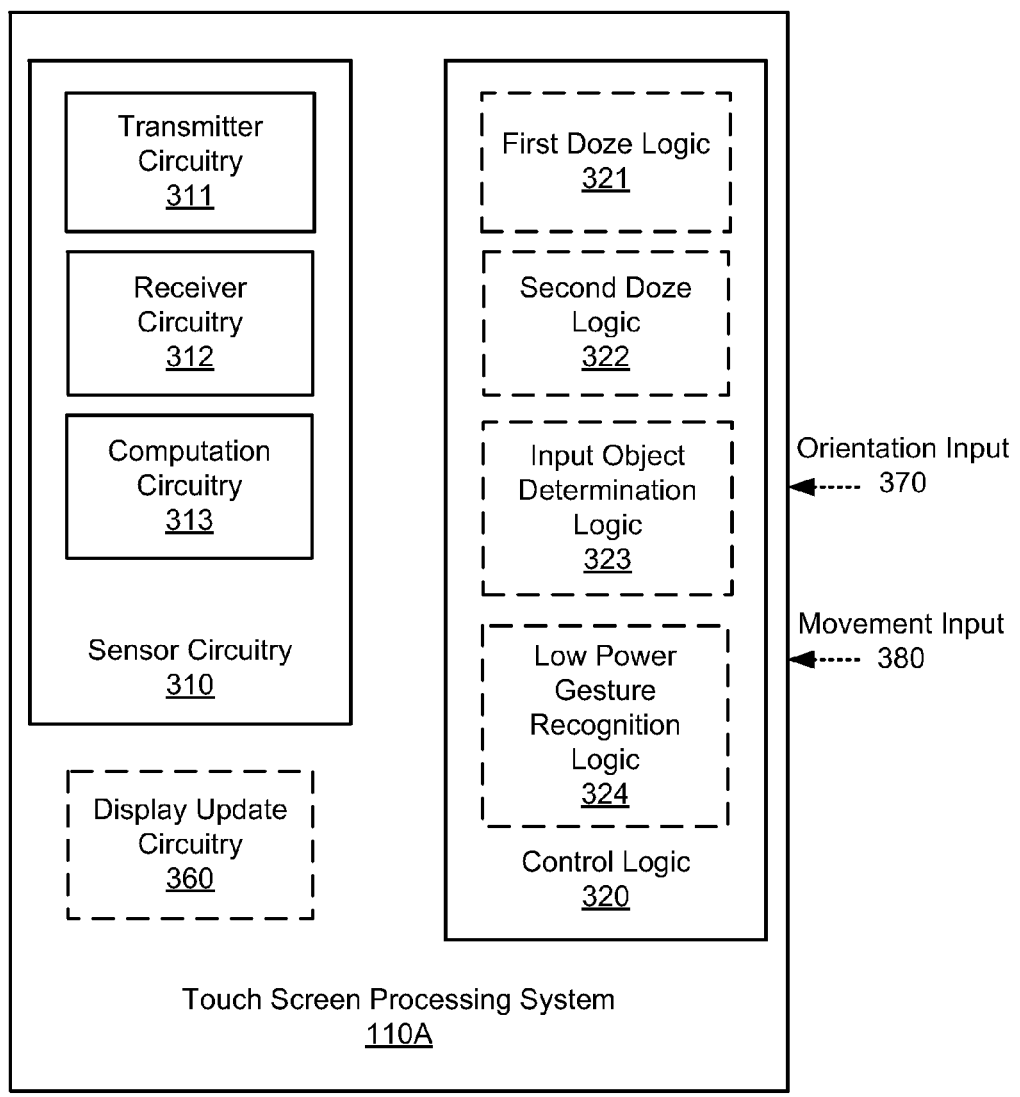
Figure 4:
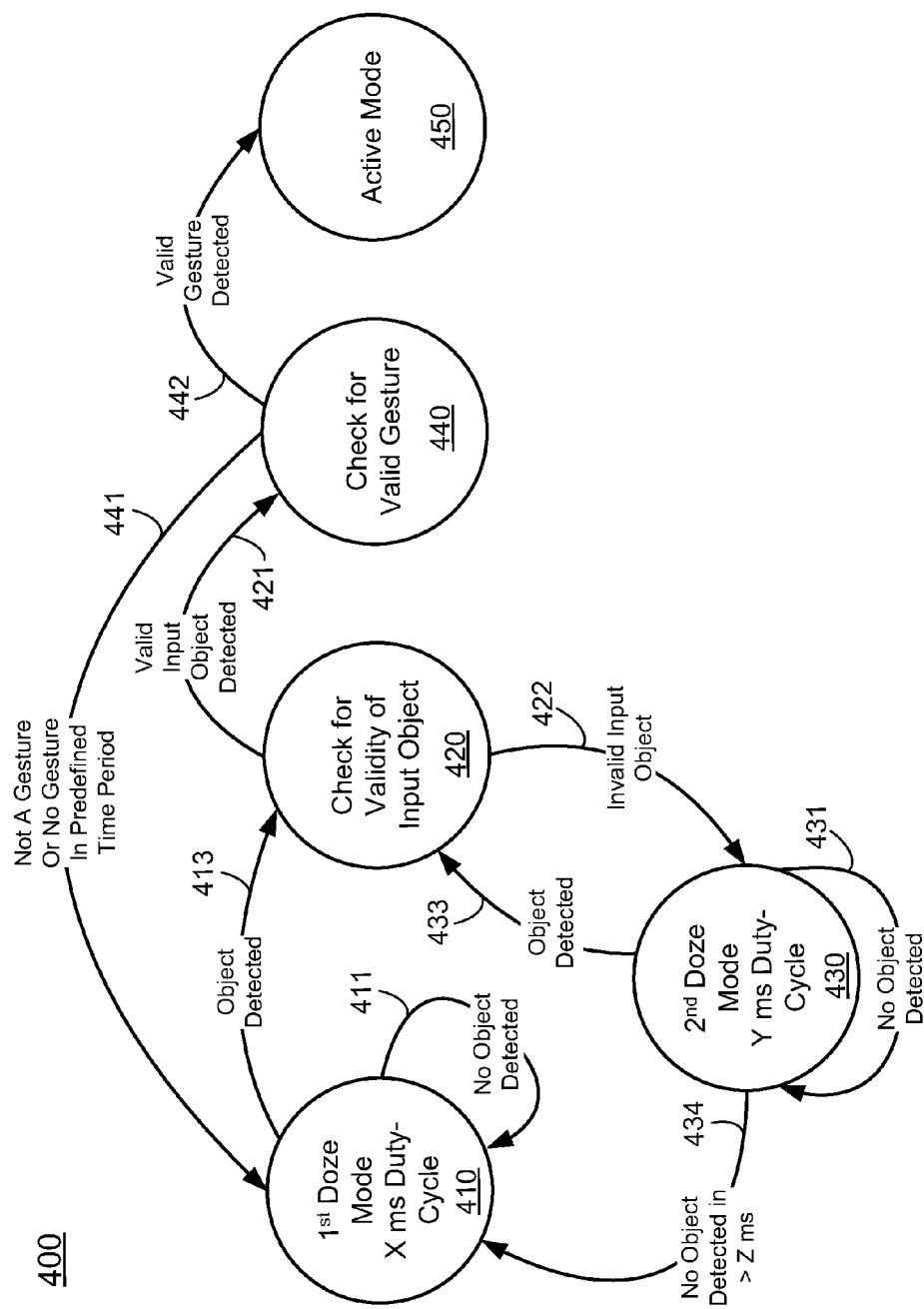
Figure 5:
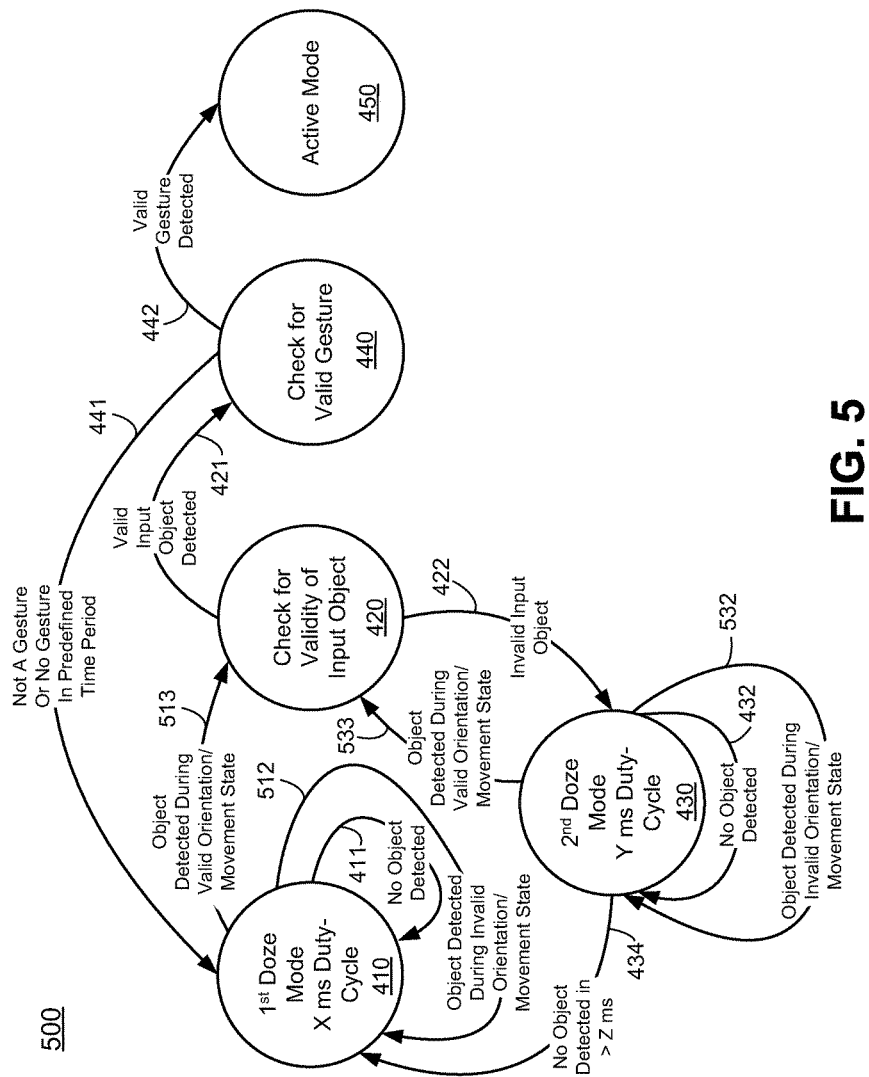
Figure 6:
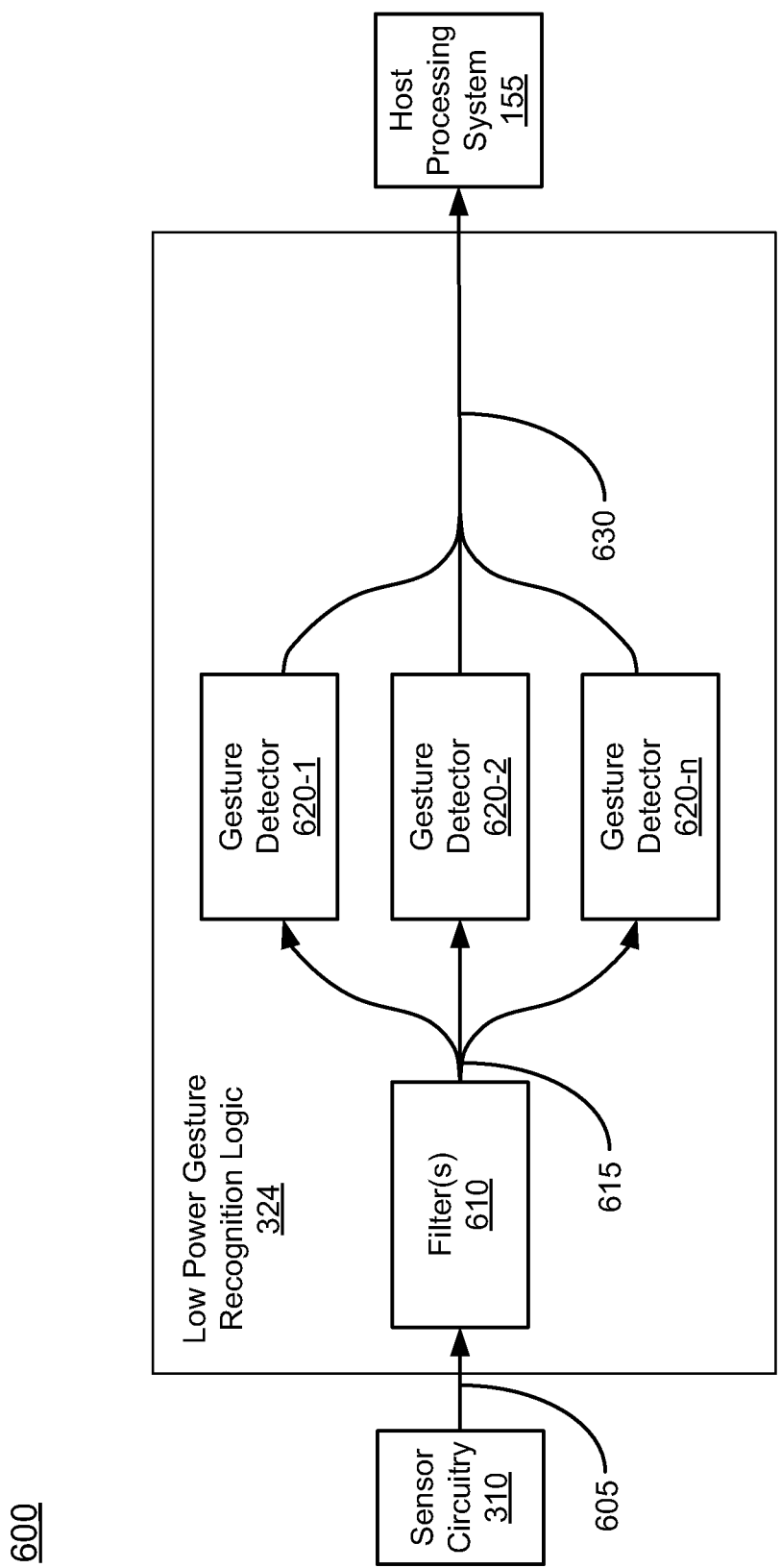
Figure 7:
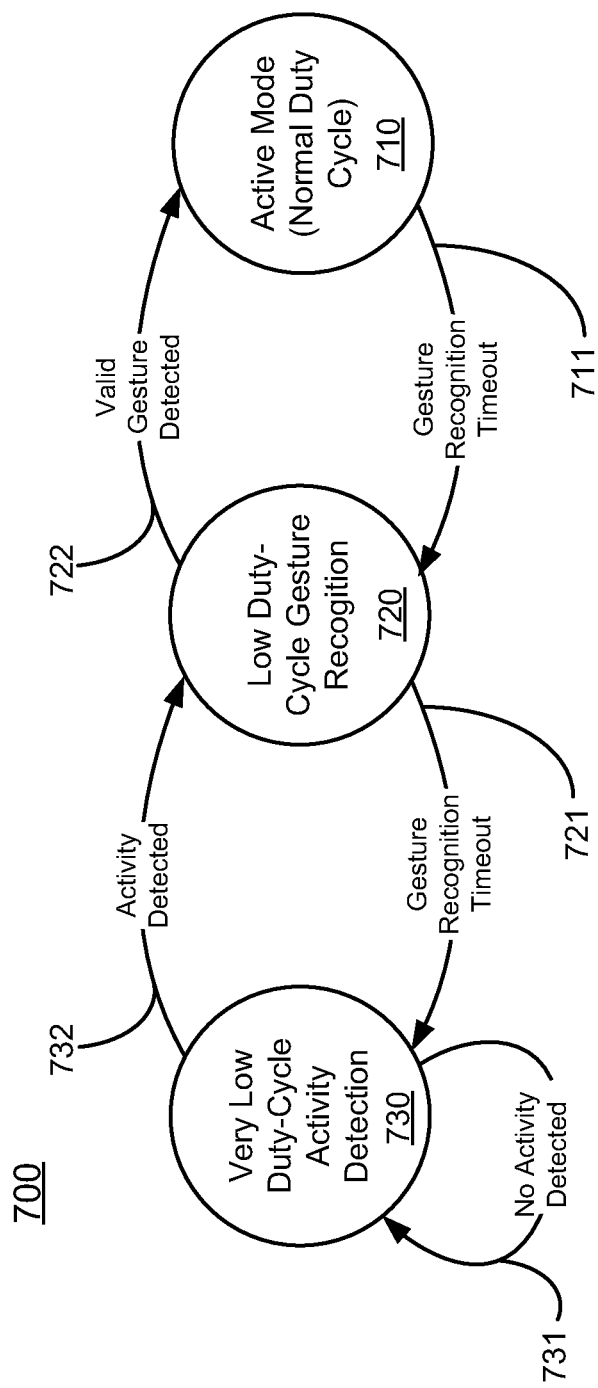
Figure 8A:
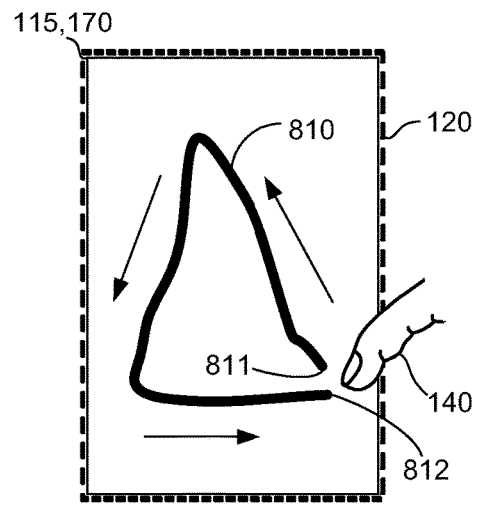
FIG. 8D illustrates a non-limiting example of a valid discrete gesture, which may be employed with various embodiments described herein.
FIG. 8E illustrates a non-limiting example of a valid combination of continuous and discrete gestures, which may be employed with various embodiments described herein.

Referring now to FIG. 8A a continuous triangular gesture 810 is illustrated which begins with a touch by finger 140 at location 811 and proceeds with continual motion until finger 140 lifts-off at point 812.

Figure 8B:
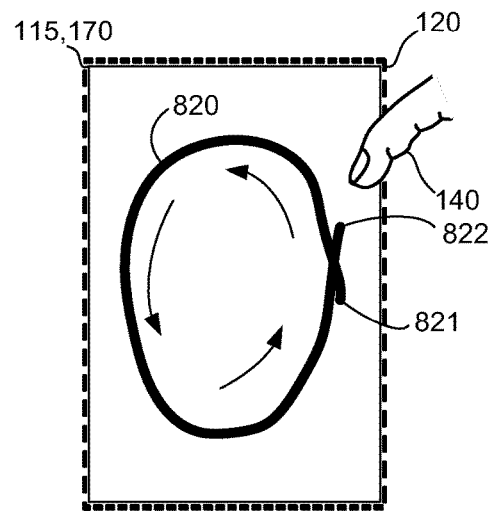

Referring now to FIG. 8B a continuous circular gesture 820 is illustrated which begins with a touch by finger 140 at location 821 and proceeds with continual motion until finger 140 lifts-off at point 822.

Figure 8C:
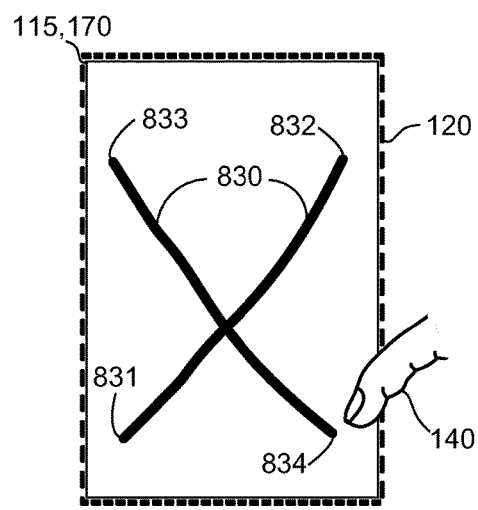

Referring now to FIG. 8C a two-part sequence of continuous gestures is illustrated which form an X-shaped gesture 830. X-shaped gesture 830 begins with a touch by finger 140 at location 831 and proceeds with continual motion until finger 140 lifts-off at point 832, then restarts at location 833 and proceeds with continual motion to lift-off at location 834.

Figure 8D:
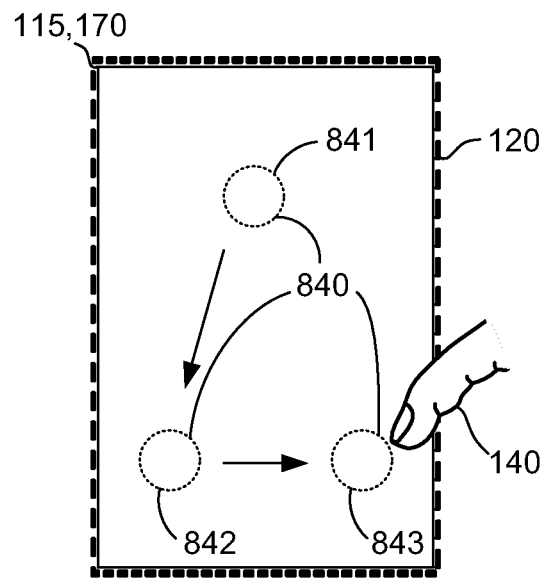

Referring now to FIG. 8D, a triple tap gesture 840 in the shape of a triangle is illustrated which begins with a tap and release by finger 140 at location 841, followed by a touch and release by finger 140 at location 842, followed by a touch and release by finger 140 at location 843. In some embodiments, the angles and/or distances between locations 841, 842, and 843 are measured to determine the validity of the gesture. For example, in some embodiment the angles between tapped locations 841, 842, 843 need to define a triangle shape which is substantially isosceles, substantially equilateral, or substantially right. In some embodiment, at least two of the tapped locations may be required to be within a certain distance of different corners of a touch screen. In some embodiments, the triangle formed by the taps must be of at least a certain size in order to confidently differentiate a valid gesture from inadvertent contact. It should be appreciated that other shapes could, such as a rectangle, can similarly be created with multiple taps.

Figure 8E:
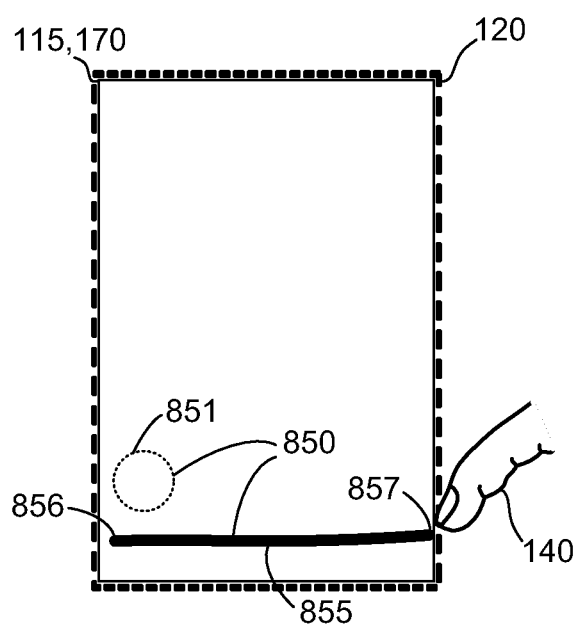

Referring now to FIG. 8E, a non-limiting example of a valid combination of continuous and discrete gestures, is illustrated. For example, to create the combination gesture 850 shown in FIG. 8E, finger 140 taps and releases at location 851, then begins a swipe 855 at location 856 and ending at location 857 as finger 140 swipes off of the right edge of touch screen 115. In some embodiments, the location 851 of the tap may be required to be within a certain distance (e.g., 2 cm) of the beginning location 856 of swipe 855, in order for combination gesture 851 to be considered valid. Conversely, in some embodiments, the location 851 of the tap may be required to be outside of a certain distance (e.g., 2 cm) of the beginning location 856 of swipe 855, in order for combination gesture 851 to be considered valid. In some embodiments swipe 855, may be required to be of a certain distance in length, a certain duration in time, and/or to exit off of the edge of touch screen 115 in order for combination gesture 850 to be considered valid.

While the shape of a gesture can distinguish it from an accidental input, it is appreciated that the shape alone does not make gestures 810, 820, 830, and 840 valid gestures. Rather, the gesture must be one of a selection of predefined gestures which are being looked for by gesture detectors. Further, to be recognized as valid, a gesture must be made at a speed that is neither too slow nor too fast and for a duration which is long enough but not too long to be detected and recognized at the sensing duty cycle at which gesture recognition is performed by a touch screen processing system 110A. For example, if gesture recognition is performed at 120 Hz (which may be a normal sensing rate when in active mode) with a rolling buffer of 60 filtered capacitive sensing inputs 615 it would be desirable for the gesture to be completed in approximately 0.5 seconds. Because of the high sample rate, duration of the gesture is not much of a factor, as it would be difficult (though not impossible) to complete the gesture too quickly to acquire adequate capacitive inputs for correlation with predefined valid gestures. Similarly, if gesture recognition is performed at 30 hertz with rolling buffer of 15 filtered capacitive sensing inputs 615, it would be desirable for the gesture to be completed in approximately 0.5 seconds which may equate to a gesture speed of no more than about 20 cm/second (depending on the size of touch screen 115). However, with fewer capacitive inputs being compared, accomplishing the gesture too fast, such as in 0.1 seconds, may not result in a long enough gesture duration to result in enough filtered capacitive sensing inputs 615 being acquired for a gesture detector 620 to positively correlate the gesture to a with a valid gesture. Based on this discussion, it should be apparent that a variety of factors weigh in on what constitutes the range of gesture speed and gesture duration which are acceptable.

In the spirit of the examples of FIGS. 8A-8E, it is appreciated that a variety of single or multi-part continuous gestures, discrete gestures, or combination thereof may be defined and used as valid gestures with a touch screen 115.

The location of a gesture can be used to distinguish from accidental contact. For example, in some embodiments, a start and/or end of a valid gesture must occur within some predefined region(s) of the touch screen 115. Thus a double tap gesture, in some embodiments, must occur within some predefined portion or portions of the touch screen 115 and/or with some predefined distance relationship with the first tap relative to the second tap.

Figure 9A:
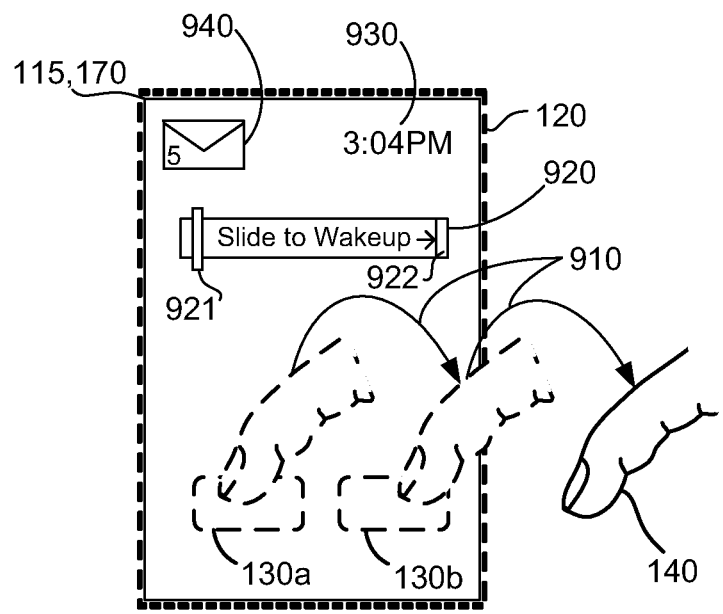

FIG. 9A illustrates some non-limiting examples of valid discrete gestures 910, continuous gestures 920, and combination discrete and continuous gestures 910/920, which may be employed with various embodiments described herein. For example, discrete gesture 910 comprises finger 140 sequentially tapping and releasing in predefined locations of a touch screen 115 that are associated with capacitive touch sensing virtual button 130a and with capacitive touch sensing virtual button 130b. To constitute a valid gesture, such tapping and releasing needs to match a predefined pattern, occur within a specified amount of time, and (in some embodiments) occur at predefined locations. The duration of a tap and the amount of time between taps (especially if they are closely located on a touch screen) is highly dependent upon the duty-cycle at which capacitive input sensing is performed. Thus, with more relaxed duty cycles, the duration of a tap is required to be longer. Similarly, the time between closely located or collocated taps also increases as a duty cycle is relaxed. The sequential tapping and releasing of virtual buttons 130a and 130b which are in different locations from one another on touch screen 115 is a gesture more easily recognized than multiple taps in the same location, and more easily differentiated from accidental contact. Because of this, the duration between the taps of virtual buttons 130a and 130b can be shorter than for taps in the same location on touch screen 115.

In some embodiments, a timeout occurs if the duration between discrete portions of a discrete gesture exceeds a predefined amount of time. When such a timeout occurs, a discrete gesture is required to start over in order to be sensed as valid. It should be appreciated that a variety of discrete tapping and releasing patterns may be employed as valid discrete gestures. Some non-limiting examples include three taps and releases in a triangular shape; a double tap in which the second tap is located within a certain radius of the first tap; and taps in multiple corners of a rectangular touch screen, such as touch screen 115.

In one embodiment, as illustrated in FIG. 9A, a one-dimensional continuous gesture 920 can be made by finger 140 sliding from location 921 to location 922 where finger 140 then lifts-off. This may cause a visual depiction of a slider to follow the position of finger 140 if the display screen is in a partially or fully active configuration.

In one embodiment, a host processing system 155 may be directed to transition from a low power state to an active mode only upon consecutive receipt of gestures 910 and 920. For example, in response to receiving and validating discrete gesture 910 a processing system 110A may display a traceable path for a continuous gesture (such as the depicted slider in FIG. 9A, or a traceable triangle for continuous gesture 810 of FIG. 8A). In one embodiment, completing only gesture 910 may cause processing system 110A to briefly present the current time 930 on display screen 170 and/or present on display screen 170 a graphic illustrating a status 940 such as the number of unread messages in a text message in-box or an electronic mail in-box. For example, the numeral five inside of the envelope shaped icon is indicative of five unread messages. In one embodiment, the information is displayed without interrupting or otherwise activating the host processing system 155. For example, the host processing system may periodically, or before entering a non-active mode, send information relating to the time, status of the device (e.g., power remaining, etc.), or messages and emails received to touch screen processing system 110A. The information may be stored in a memory of the touch screen processing system 100A and displayed to the user upon completion or partial completion of a valid gesture by the display update circuitry. Completion of both discrete gesture 910 and then continuous gesture 920 within a specified period of time causes host processing system 155 to be directed to transient from a low power state to an active mode. It should also be appreciated that multiple valid gestures may be recognized to enable different functionality. For example, a gesture 910 may result in information being displayed on the display screen without activating or otherwise interrupting the host processing system 155. A gesture 920 may result in a wake up decision being sent to the host processing system 155.

Figure 9B:
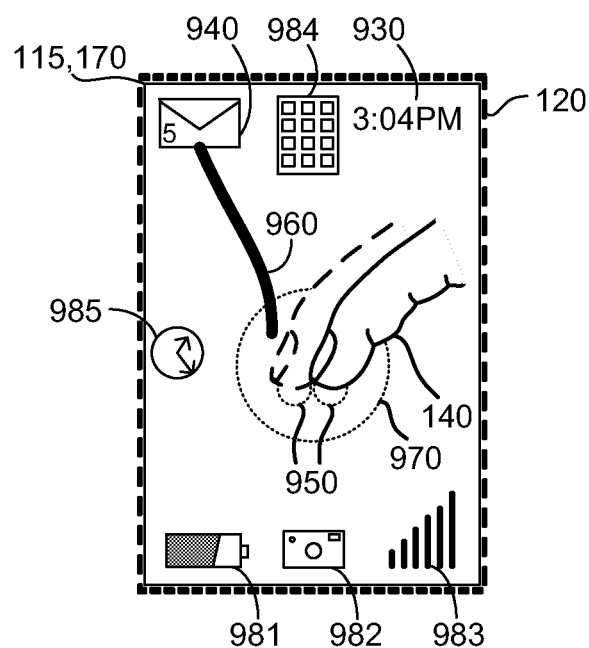

FIG. 9B illustrates some non-limiting examples valid discrete gestures 950, continuous gestures 960, and combination discrete and continuous gestures 970/960, which may be employed with various embodiments described herein. In one embodiment, as illustrated in FIG. 9B, a first valid gesture 950 may cause processing system 110A to present information to the user on the display and a second valid gesture 960 may cause processing system 110A to wake or enable increased functionality of the host processing system 155. In one example as shown in FIG. 9B, the first valid gesture 950 comprises a double tap in a central portion 970 of the touch screen 115. Upon completion of the first valid gesture, the processing system 110 presents the user with information regarding the state of the device (e.g., remaining battery 981, reception quality 983, time 930, unread messages 940, etc.), items requiring the user's attention (e.g., unread messages 940, timers 985, etc.), shortcuts to applications (e.g., mail/unread messages 940, camera 982, phone 984, etc.) stored on the device and/or a visual indication of the required "path" of second gesture 960. The second gesture 960 comprises a gesture which indicates a desired action by the user to potentially access further functionality of the device with respect to the displayed information. The second gesture may comprise a path which begins at any of the regions relating to the displayed information and ends in a region which requires the host processing system 155 to be enabled. For example, as can be seen in FIG. 9B, the second gesture 960 comprises a swipe from the mail/unread messages shortcut 940 to the central portion 970. Upon the completion of the gesture, the host processing system is enabled and the displayed information on the touch screen 115 comprises the relevant mail application and the like.

It should be appreciated that multiple valid gestures may be recognized to enable different functionality. For example, a gesture 910/950 may result in information being displayed on the display screen without activating or otherwise interrupting the host processing system 155. A gesture 920/960 may result in a wake up decision being sent to the host processing system 155. The display update circuitry 360 of touch screen processing system 110A may display visible information to the user without the involvement of the host processing system 155.

It should also be appreciated that the example of FIG. 9B is only one of many possibilities of gestures which can selectively wake the host processing system 155 to enable full functionality of the electronic system. The first and second gestures may be complimentary, or extensions of the same gesture. For example, the first valid gesture may comprise a tap and hold, while the second valid gesture may comprise a swipe after the hold (or vice-a-versa). Furthermore, gestures other than the first and second type may be recognized as valid to immediately enable full functionality of the electronic device (and host processing system 155). Examples of such gestures are discussed but not limited to those of FIGS. 8A-8E.

Example Methods of Operation

Figure 10A:
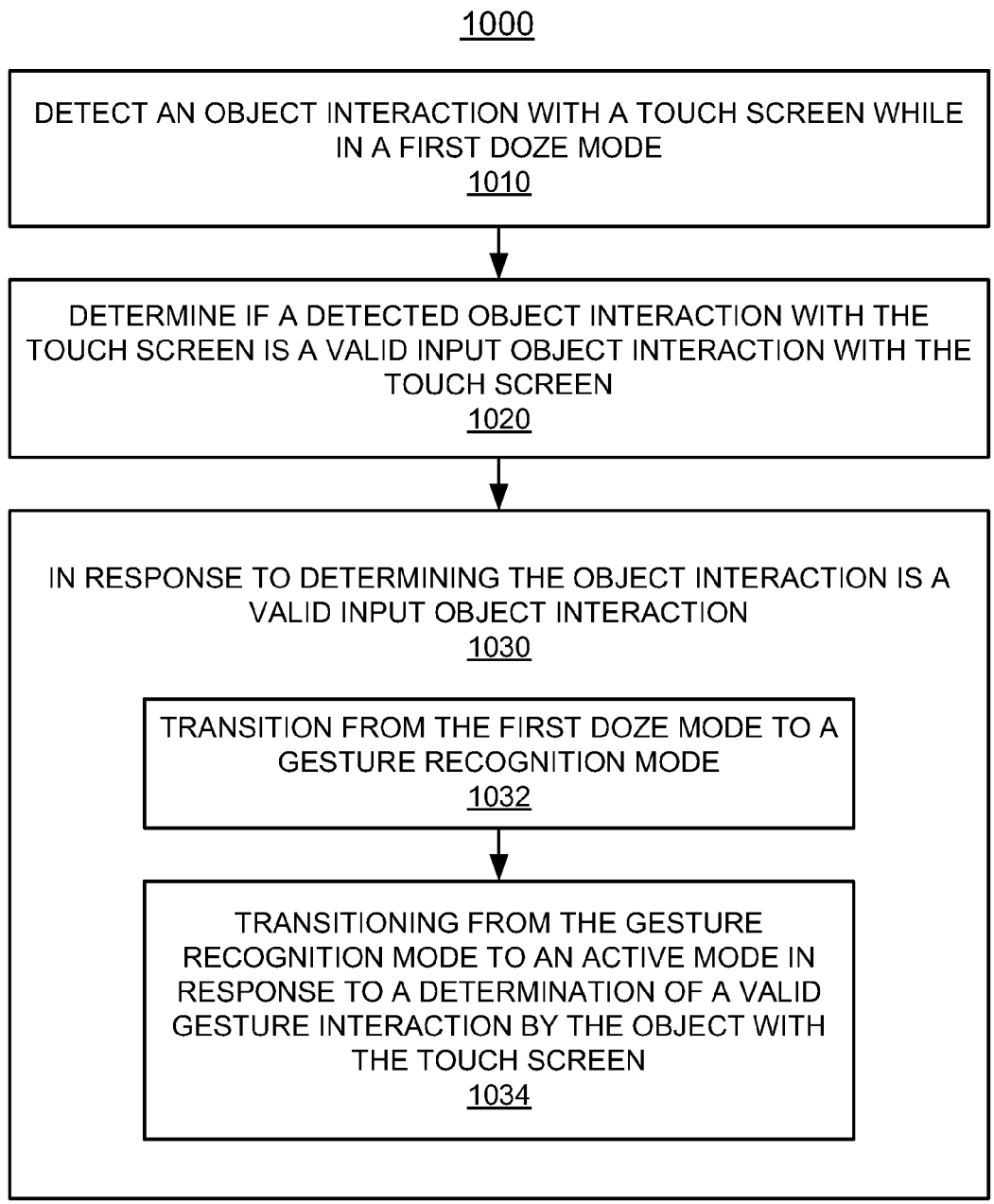
Figure 10B:
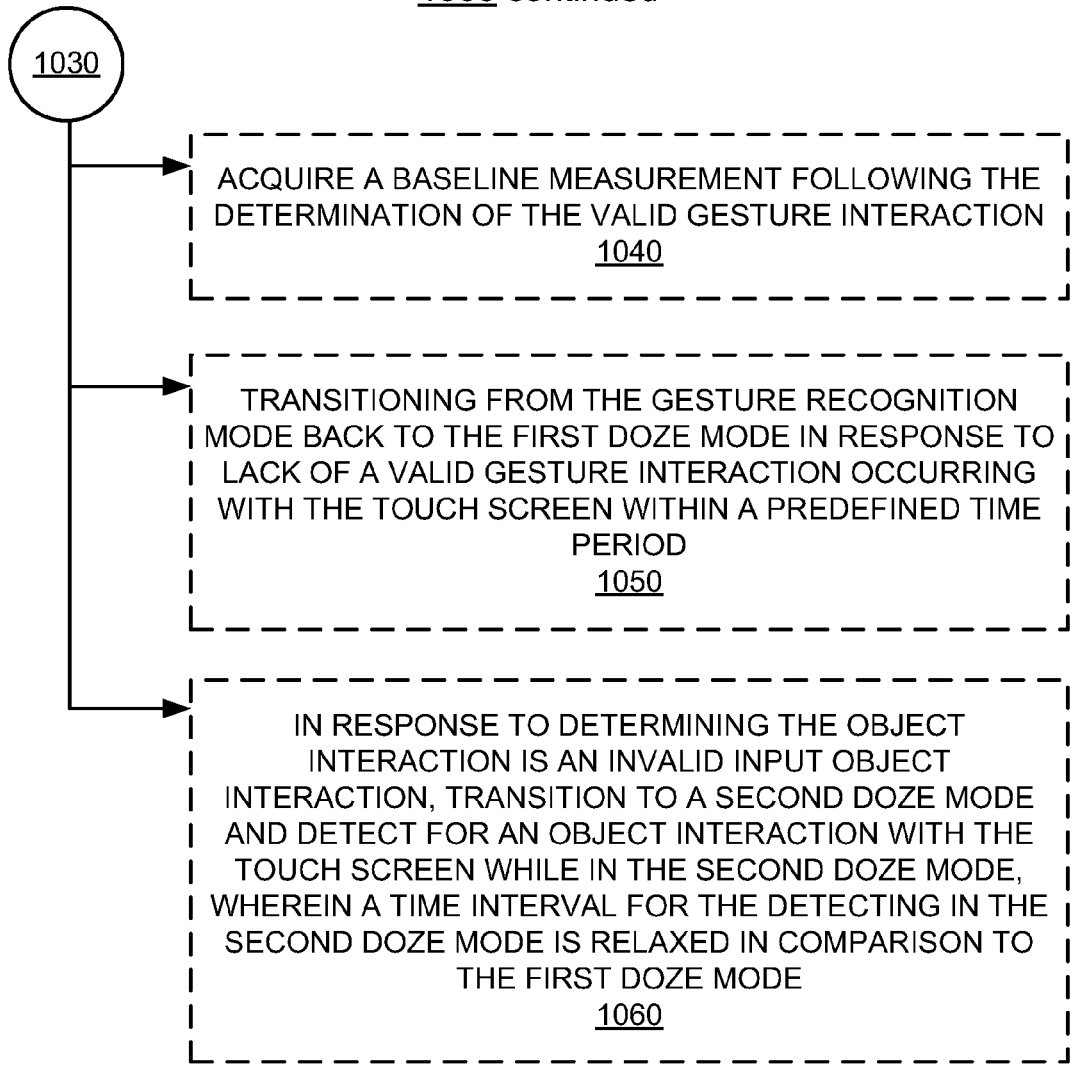

FIGS. 10A and 10B illustrates a flow diagram 1000 of procedures in an example method of operating a touch screen of a capacitive input device, according to various embodiments. Procedures of this method will be described with reference to elements and/or components of one or more of FIGS. 1-7 and the valid wakeup inputs illustrated and described in conjunction with FIGS. 8A-8E, and FIGS. 9A and 9B. It is appreciated that in some embodiments, the procedures may be performed in a different order than described, that some of the described procedures may not be performed, and/or that one or more additional procedures to those described may be performed.

At procedure 1010 of flow diagram 1000, in one embodiment, an object interaction with a touch screen of a capacitive input device is detected while the touch screen is operated in a first doze mode. In one embodiment, this can comprise sensing an object interaction with touch screen 115 while first doze logic 321 is operating sensor circuitry 310 in a first doze mode.

At procedure 1020 of flow diagram 1000, in one embodiment, it is determined whether a detected object interaction with the touch screen of the capacitive input device is a valid input object interaction with the touch screen. For example, in one embodiment, this comprises input object determination logic 323 determining if a detected object is a valid input object. This determination can be based on the detected object sufficiently resembling the size and shape of input object 140 (e.g., a stylus or a human digit). It some embodiments, one or more of the orientation and movement of touch screen 115 are used in the input determination to determine if a sensed object is a valid input. For example, if an electronic system 150 in which touch screen 115 is disposed is moving violently based on movement inputs 380, a valid input object interaction may be ruled out when an object is sensed. Likewise if it is known from orientation inputs 370 that electronic system 150 is oriented such that touch screen 115 is face down on a surface or upside-down a valid input object interaction may be ruled out when an object is sensed.

At procedure 1030 of flow diagram 1000, in one embodiment, actions are performed in response to determining the object interaction is a valid input object interaction. For example, at procedure 1032 of flow diagram 1000, in one embodiment, touch screen operation transitions from the first doze mode to a gesture recognition mode. This can comprise processing system 110A transitioning from utilizing first doze logic 321 to control sensor circuitry 310 to employing low power gesture recognition logic 324 to control sensor circuitry 310. In one embodiment, a processing system 110A may provide low power feedback to a user of the touch screen while in the gesture recognition mode. With reference to FIG. 9A, this may comprise one or more of: displaying a traceable pattern for input of a continuous gesture on display screen 170; displaying a clock with the current time on display screen 170; and displaying on display screen 170 some limited information, such as the number of unread messages in an in-box accessible via an electronic system 150. In some embodiments, to conserve power, display screen 170 is only partially illuminated/lit when providing such low power feedback. In some embodiments, no activity by a display screen processing system 160 or host processing system 155 of the electronic system is required in order to provide this low power feedback. It should be appreciated that these are non-limiting examples and other types of low power feedback are possible (e.g., haptic or audible signals).

At procedure 1034 of flow diagram 1000, in one embodiment, operation of the touch screen transitions from the gesture recognition mode to an active mode in response to a determination of a valid gesture interaction by the object with the touch screen. For example, if low power gesture recognition logic 324 recognizes the valid input of a predetermined gesture by the sensed object, then the touch screen transitions from gesture recognition mode to an active mode of operation. This can comprise "wakeup" of capacitive input device 100 and may further comprise wakeup of a host processing system 155 disposed in the electronic system 150 of which touch screen 115 is a part. It is appreciated that the valid gesture interaction with the touch screen may comprise a single contact interval continuous gesture (e.g., gestures 810 and 820), a multiple contact interval continuous gesture (e.g., gesture 830), a multiple contact discrete gestures (e.g., gesture 910), or some combination of the foregoing.

In one embodiment, at procedure 1040, flow diagram 1000 further comprises acquisition of a capacitive baseline measurement following the determination of the valid gesture interaction. The baseline measurement may be a capacitive image baseline, a capacitive profile baseline, or some other baseline associated with the type of touch screen sensing being performed in the active mode of operation of touch screen 115 of capacitive input device 100. In one embodiment, this baseline is acquired after lift-off of an input object upon completion of and recognition of input of a valid gesture interaction with touch screen 115.

In one embodiment, at procedure 1050, flow diagram 1000 further comprises touch screen 115 transitioning from the gesture recognition mode back to the first doze mode in response to lack of a valid gesture interaction occurring with touch screen 115 within a predefined time period. This is illustrated by arrow 441 in state diagrams 400 and 500.

In one embodiment in response to determining the object interaction is an invalid input object interaction, at procedure 1060, flow diagram 1000 further comprises touch screen 115 transitioning to a second doze mode and detecting an object interaction with the touch screen while in the second doze mode. In some embodiments, a time interval for detecting for object interactions in the second doze mode is relaxed in comparison to the time interval at which detecting for object interactions is performed in the first doze mode. For example, this comprises transitioning from first doze logic 321 operating sensor circuitry 310 to second doze logic 322 operating sensor circuitry 310, and relaxing the object detection duty-cycle. This transition is illustrated by arrow 422 in state diagrams 400 and 500.

It is appreciated that in addition to or as an alternative to relaxing the time interval for object detection, a baseline capacitive measurement may be adjusted in response to persistence of the invalid input object interaction. By adjusting this baseline measurement, it becomes less likely that the persistent object will be repeatedly detected and consequently checked for validity as it will blend into the baseline. It is appreciated that the baseline may be incrementally adjusted in response to iterative transitions between states 420 and 430 due to the detected presence of a persistent but invalid input object.

Touch screen 115 transitioning from operating in the second doze mode to operating in the first doze mode after a predefined period of time has passed without detection of additional object interaction with the touch screen. This transition is illustrated by arrow 434 in state diagrams 400 and 500.

FIG. 11 illustrates a flow diagram 1100 of procedures in an example method of operating a touch screen of a capacitive input device, according to various embodiments. Procedures of this method will be described with reference to elements and/or components of one or more of FIGS. 1-7 and the valid wakeup inputs illustrated and described in conjunction with FIGS. 8A-8E, and FIGS. 9A and 9B. It is appreciated that in some embodiments, the procedures may be performed in a different order than described, that some of the described procedures may not be performed, and/or that one or more additional procedures to those described may be performed.

At procedure 1110 of flow diagram 1100, in one embodiment, a touch screen 115 is operated in a low power state. The touch screen 115 is configured to detect object interaction in a sensing region 120 of touch screen 115. The low power state comprises determining a plurality of resulting signals using the sensor circuitry 310 of the touch screen to operate sensor electrodes at a first rate. For example, and with reference to FIGS. 6 and 7, this can comprise operating sensor circuitry 310 at a first duty cycle which is lower than the active mode duty cycle at which the sensor circuitry 310 is operated. In this manner, resulting signals from sensor electrodes 260 and 270 can be acquired and processed by computation circuitry 313. The resulting signals provide successive capacitive sensing inputs 605 in the form of capacitive images or capacitive pixels.

At procedure 1120 of flow diagram 1100, in one embodiment, the touch sensor is operated to examine differences in consecutive resulting signals obtained at the first rate for the presence of a valid gesture interaction. For example, numerous consecutive capacitive images or pixels can be compared to determine if difference indicate that a valid gesture interaction has been input in sensing region 120 of touch screen 115.

It is appreciated that the valid gesture interaction with the touch screen may comprise a one of a plurality of single contact interval continuous gesture (e.g., gestures 810 and 820), one of a plurality of multiple contact interval continuous gesture (e.g., gesture 830), one of a plurality of multiple contact discrete gestures (e.g., gestures 910), or one of a plurality of valid input gestures which combine continuous interval and discrete components. The valid gesture interaction may take a predefined minimum and/or maximum amount of time to complete. The minimum and maximum times for completion are based on one or more of the sensing rate and the number of consecutive resulting signals which are needed for an gesture detection to occur.

At procedure 1130 of flow diagram 1100, in one embodiment, in response to a determination of a valid gesture interaction, touch screen 115 exits the low power state and transitions to an active mode. Further, a wakeup signal may be provided which also causes a host processing system 155 to transition to from a low power state to an active mode. This is illustrated by wakeup decision 630 in FIG. 6 and arrow 722 in FIG. 7.

In one embodiment, at procedure 1140, flow diagram 1100 further comprises acquiring a baseline measurement following liftoff of an input object from the touch screen after recognizing the valid gesture interaction. The baseline measurement may be a capacitive image baseline, a capacitive profile baseline, or some other baseline associated with the type of touch screen sensing being performed in the active mode of operation of touch screen 115 of capacitive input device 100. In one embodiment, this baseline is acquired after lift-off of an input object upon completion of and recognition of input of a valid gesture interaction with touch screen 115.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of operating a touch screen, said method comprising:
    detecting, via capacitive sensing, a first object interaction with said touch screen while in a first doze mode to obtain a first detected object interaction,
        wherein said detecting while in said first doze mode is provided by one or more sensor electrodes that are also used for an active mode of capacitive sensing within a sensing region of said touch screen, and
        wherein said detecting while in said first doze mode is performed at a first duty cycle;
    determining, in said first doze mode, whether said first detected object interaction with said touch screen is a valid input object interaction with said touch screen and transitioning to a check input object validity mode,
    wherein an invalid orientation of said touch screen will invalidate said first detected object interaction and return to said first doze mode;
    in response to determining said first detected object interaction is an invalid input object interaction in said check input object validity mode, transitioning to a second doze mode;
    detecting, via capacitive sensing, a second object interaction with said touch screen while in the second doze mode to obtain a second detected object interaction, wherein said detecting while in said second doze mode is performed at a second duty cycle, said second duty cycle being less frequent than said first duty cycle;

determining whether said second detected object interaction with said touch screen is said valid input object interaction with said touch screen and transitioning to the check input object validity mode; and in response to determining said second detected object interaction is said valid input object interaction in said check input object validity mode:

transitioning from said check input object validity mode to a gesture recognition mode; and transitioning from said gesture recognition mode to said active mode in response to a determination of a valid gesture interaction by an object with said touch screen, wherein said gesture recognition mode is performed at a third duty cycle, said third duty cycle being the same as the first duty cycle and being different from said second duty cycle, and wherein said active mode comprises performing capacitive sensing at a fourth duty cycle, said fourth duty cycle being more frequent than said first duty cycle, said second duty cycle, and said third duty cycle.

2. The method as recited in claim 1, further comprising: acquiring a baseline measurement following said determination of said valid gesture interaction.

3. The method as recited in claim 1, further comprising: transitioning from said gesture recognition mode to said first doze mode in response to lack of a valid gesture interaction occurring with said touch screen within a predefined time period.

4. The method as recited in claim 1, further comprising: adjusting a baseline measurement in response to a repeated detection of the invalid input object interaction following said transition to said second doze mode.

5. The method as recited in claim 1, further comprising: transitioning from said second doze mode to said first doze mode after a predefined period of time has passed without detection of additional object interaction with said touch screen.

6. The method as recited in claim 1, wherein said determining whether said first detected object interaction with said touch screen is a valid input object interaction with said touch screen further comprises:
utilizing movement information of said touch screen as part of said determination.

7. The method as recited in claim 1, wherein said transitioning from said second doze mode to said gesture recognition mode further comprises:
providing low power feedback while in said gesture recognition mode.

8. The method as recited in claim 1, wherein said transitioning from said gesture recognition mode to said active mode in response to a determination of a valid gesture interaction with said touch screen comprises:
transitioning from said gesture recognition mode into said active mode in response to recognizing said valid gesture interaction, wherein said valid gesture interaction comprises a single contact interval gesture.

9. The method as recited in claim 1, wherein said transitioning from said gesture recognition mode to said active mode in response to a determination of a valid gesture interaction with said touch screen comprises:
transitioning from said gesture recognition mode into said active mode in response to recognizing said valid gesture interaction, wherein said valid gesture interaction comprises a multiple contact interval gesture.

10. A touch screen processing system for an electronic system, said touch screen processing system comprising:
sensor circuitry configured to capacitively detect object interaction in a sensing region of said touch screen;
display update circuitry configured to update a display associated with said touch screen;
a control logic configured to:
detect, via capacitive sensing with said sensor circuitry, at a first duty cycle for a first object interaction with said touch screen while in a first doze mode to obtain a first detected object interaction,
wherein said first doze mode comprises a host processor of said electronic system being in a low power state and operations associated with said touch screen being processed by said touch screen processing system, and
wherein said detection while in said first doze mode is provided by one or more sensor electrodes that are also used for an active mode of capacitive sensing within said sensing region of said touch screen,
detect, via capacitive sensing with said sensor circuitry, at a second duty cycle for a second object interaction with said touch screen while in a second doze mode to obtain a second detected object interaction, said second duty cycle being less frequent than said first duty cycle; and a determination module configured to:
determine whether said first detected object interaction with said touch screen is a valid input object interaction with said touch screen and transitioning to a check input object validity mode, wherein an invalid orientation of said touch screen will invalidate said detected object interaction and return to said first doze mode;
in response to determining said first detected object interaction is an invalid input object interaction in said check input object validity mode, transitioning to the second doze mode;
determine, in said second doze mode, whether said second detected object interaction with said touch screen is said valid input object interaction with said touch screen;
in response to a determination that said second detected object interaction is said valid input object interaction:
transition from said second doze mode to said check input object validity mode and in response to detecting a valid input object, transition to a gesture recognition mode; and
transition from said gesture recognition mode to said active mode in response to a determination of a first type of valid gesture interaction with said touch screen by said object,
wherein said gesture recognition mode is performed at a third duty cycle, said third duty cycle being the same as the first duty cycle and being different from said second duty cycle, and
wherein said active mode comprises said host processor departing said low power state, wherein said active mode comprises performing capacitive sensing at a fourth third duty cycle, said fourth third duty cycle being more frequent than said first duty cycle, said second duty cycle, and said third duty cycle; and in response to a determination of a second type of valid gesture interaction with said touch screen:
update said display while said host processor remains in said low power state.

11. The touch screen processing system of claim 10, wherein said gesture recognition mode comprises said host processor remaining in said low power state and said gesture recognition being performed by said touch screen processing system.

12. An electronic system, said electronic system comprising:
sensor circuitry configured to:
capacitively detect object interaction in a sensing region, wherein the sensing region overlaps a display, wherein said capacitive detection, while in a first doze mode, is provided by one or more sensor electrodes that are also used for an active mode of said capacitive detection within said sensing region that overlaps said display;
display update circuitry configured to update said display; and
a processing system configured to:
operate said sensor circuitry at a first duty cycle to capacitively detect for a first object interaction in said sensing region while the electronic system is in said first doze mode to obtain a first detected object interaction;
determine, in said first doze mode, whether said first detected object interaction in said sensing region is a valid input object interaction performing a valid gesture interaction and transitioning to a check input object validity mode,
wherein an invalid orientation of said touch screen will invalidate said detected object interaction and return to said first doze mode;
in response to determining said first detected object interaction is an invalid input object interaction in said check input object validity mode, transitioning to the second doze mode;
operate said sensor circuitry at a second duty cycle to capacitively detect for a second object interaction in said sensing region while the electronic system is in said second doze mode to obtain a second detected object interaction, said second duty cycle being less frequent than said first duty cycle,
determine whether said second detected object interaction with said touch screen is said valid input object interaction with said touch screen and transitioning to the check input object validity mode; and
in response to a determination that said second detected object interaction is said valid input object interaction in said check input object validity mode:
transition from said check input object validity mode to a gesture recognition mode; and
transition from said gesture recognition mode to said active mode in response to a determination of a valid gesture interaction with said touch screen by said object,
wherein said gesture recognition mode is performed at a third duty cycle, said third duty cycle being the same as the first duty cycle and being different from said second duty cycle, and
wherein said active mode comprises performing capacitive sensing at a fourth duty cycle, said fourth duty cycle being more frequent than said first duty cycle, said second duty cycle, and said third duty cycle.

13. The electronic system of claim 12, wherein said electronic system further comprises a host processing system wherein said host processing system transitions from a low power state to an active state in response to said determination that said object interaction is said valid input object interaction performing said valid gesture interaction.

14. The electronic system of claim 13, wherein said electronic system comprises no electromechanical input for signaling said host processing system to transition from said low power state to said active state.

* * * * *